(12) United States Patent
Kawai et al.

(10) Patent No.: US 11,702,141 B2
(45) Date of Patent: Jul. 18, 2023

(54) SUBFRAME FOR VEHICLE

(71) Applicant: F-TECH INC., Kuki (JP)

(72) Inventors: Toru Kawai, Tochigi (JP); Hiroyuki Uchida, Tochigi (JP)

(73) Assignee: F-TECH INC., Kuki (JP)

( * ) Notice: Subject to any disclaimer, the term of this patent is extended or adjusted under 35 U.S.C. 154(b) by 0 days.

(21) Appl. No.: 17/507,001

(22) Filed: Oct. 21, 2021

(65) Prior Publication Data
US 2022/0135131 A1 May 5, 2022

(30) Foreign Application Priority Data
Nov. 2, 2020 (JP) .................................. 2020-183879

(51) Int. Cl.
| | |
|---|---|
| *B62D 21/11* | (2006.01) |
| *B62D 21/03* | (2006.01) |
| *B62D 21/09* | (2006.01) |
| *B62D 21/15* | (2006.01) |

(52) U.S. Cl.
CPC .............. *B62D 21/11* (2013.01); *B62D 21/03* (2013.01); *B62D 21/09* (2013.01); *B62D 21/155* (2013.01)

(58) Field of Classification Search
CPC ........ B62D 21/03; B62D 21/09; B62D 21/11; B62D 21/155
See application file for complete search history.

(56) References Cited

U.S. PATENT DOCUMENTS

| | | | | | |
|---|---|---|---|---|---|
| 5,042,837 | A | * | 8/1991 | Kleinschmit | B60G 99/00 180/378 |
| 5,562,308 | A | * | 10/1996 | Kamei | B62D 21/11 280/788 |
| 6,109,654 | A | * | 8/2000 | Yamamoto | B62D 21/11 280/124.109 |
| 6,511,096 | B1 | * | 1/2003 | Kunert | B62D 21/11 280/124.109 |
| 6,908,111 | B2 | * | 6/2005 | Takagi | B62D 29/008 280/798 |
| 7,584,815 | B2 | * | 9/2009 | Ogawa | B60G 7/02 280/124.109 |
| 8,490,988 | B2 | * | 7/2013 | Takeshita | B62D 21/11 280/124.109 |
| 8,585,133 | B2 | * | 11/2013 | Yasuhara | B62D 25/2018 296/203.03 |

(Continued)

FOREIGN PATENT DOCUMENTS

JP  2001-030949 A  2/2001

*Primary Examiner* — Laura Freedman
(74) *Attorney, Agent, or Firm* — WHDA, LLP

(57) ABSTRACT

In a vehicle subframe 1, a first side member has a first extending portion that extends while being deflected outward on one side in a width direction as approaching from a rear side to a front side, a second side member has a second extending portion that extends while being deflected outward on the other side in the width direction as approaching from the rear side to the front side, and a second cross member is further included which is opposed to the first cross member on the front side thereof and couples a portion of the first extending portion in which the degree of outward deflection on the one side in the width direction becomes large and a portion of the second extending portion in which the degree of outward deflection on the other side in the width direction becomes large to each other.

4 Claims, 8 Drawing Sheets

(56) References Cited

U.S. PATENT DOCUMENTS

| | | | | |
|---|---|---|---|---|
| 8,851,520 B2* | 10/2014 | Goellner | ............... | B62D 21/155 |
| | | | | 296/187.1 |
| 9,079,620 B2* | 7/2015 | Komiya | ................. | B62D 21/11 |
| 9,139,227 B2* | 9/2015 | Leibl | ....................... | B62D 21/11 |
| 9,828,029 B2* | 11/2017 | Kawai | ..................... | B62D 21/11 |
| 10,689,034 B2* | 6/2020 | Schmalzrieth | ......... | B62D 21/02 |
| 2020/0047811 A1* | 2/2020 | Shimizu | ................. | B60K 17/04 |
| 2020/0102014 A1* | 4/2020 | Sakai | ..................... | B62D 21/07 |
| 2020/0172167 A1* | 6/2020 | Watanabe | ............. | B62D 21/155 |
| 2020/0180702 A1* | 6/2020 | Murata | .............. | B62D 25/2027 |
| 2022/0135130 A1* | 5/2022 | Kawai | ................. | B62D 21/155 |
| | | | | 280/784 |
| 2022/0135135 A1* | 5/2022 | Kawai | .................... | B62D 21/02 |
| | | | | 296/187.09 |

* cited by examiner

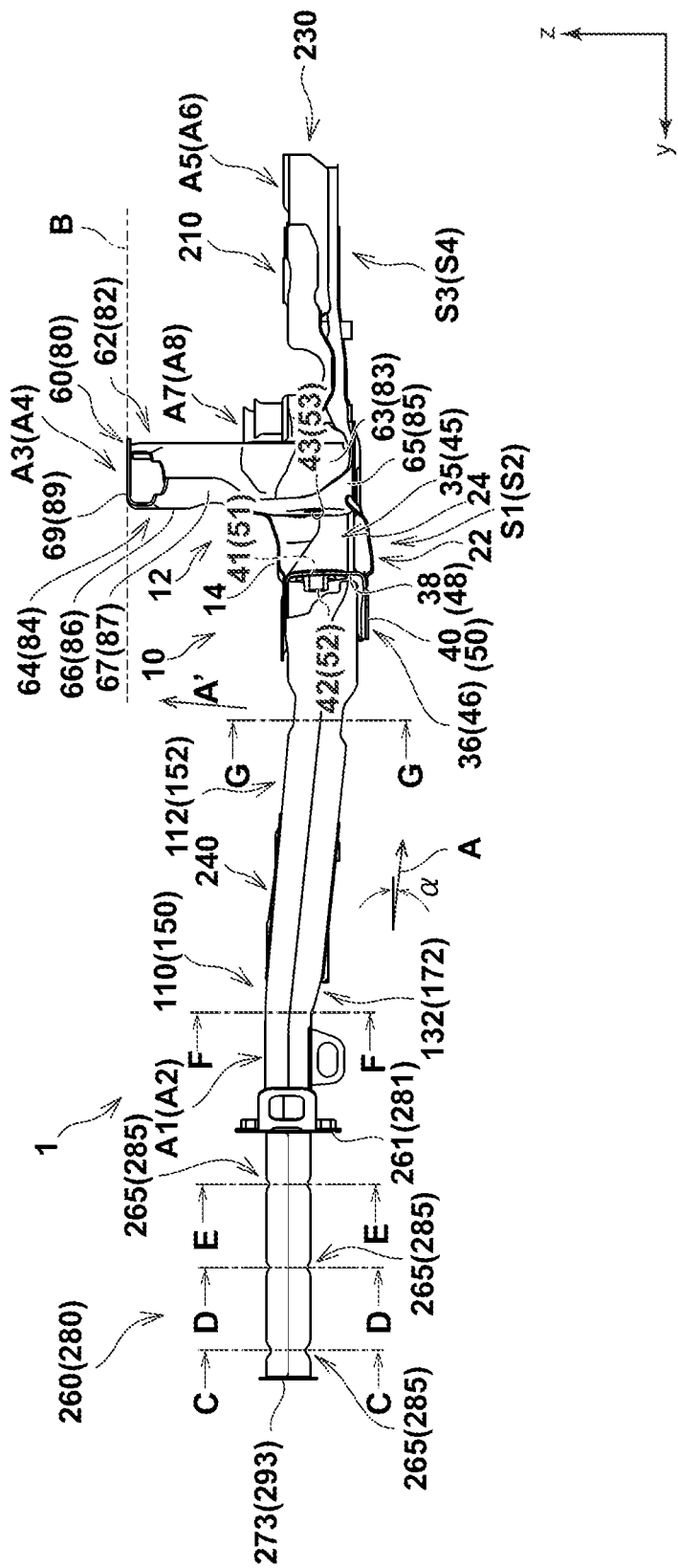

SUBFRAME FOR VEHICLE

BACKGROUND OF THE INVENTION

The present invention relates to a vehicle subframe, and particularly relates to a vehicle subframe that is attached to a vehicle such as an automobile and supports a driving source such as an internal combustion engine or an electric motor, a suspension arm, and the like.

In recent years, various external-force application parts are attached to a subframe attached to a vehicle such as an automobile, which include suspension-related parts such as a suspension arm and a stabilizer, steering-related parts such as a steering gearbox, and mount-related parts for a driving source and a gear mechanism system.

Therefore, such a subframe is required to be attached to a vehicle body with improved productivity and with increased strength and rigidity, for example.

Further, such a subframe is required to be deformed in a desired deformation mode, that is, to exhibit required crash performance typically in frontal crash of the vehicle to which the subframe is attached, in order to absorb a part of kinetic energy received by the vehicle in the crash.

Under such circumstances, Japanese Patent Application Laid-open No. 2001-30949 relates to a front body structure of a vehicle and discloses a configuration in which a suspension cross member 20 includes a pair of left and right front-rear direction members 21 and 22 that extend in a front-rear direction of the vehicle and each have a bent portion in a middle portion, a coupling member 23 that extends in a vehicle-width direction at the front ends of the front-rear direction members 21 and 22 and couples the front ends of the front-rear direction members to each other, and a suspension-arm support 24 provided on a side surface of each of the front-rear direction members 21 and 22. The suspension cross member 20 is formed by a butt welding member including thick plates 21A and 22A as its front part, thin plates 21B and 22B as its middle part, and thick plates 21C and 22C as its rear part.

SUMMARY OF THE INVENTION

However, according to the studies made by the inventors, although the configuration in Japanese Patent Application Laid-open No. 2001-30949 is intended to, in offset crash, absorb crash energy in the front-rear direction by the front-rear direction member 21 on the crash side and absorb crash energy converted to energy in the vehicle-width direction by the other front-rear direction member 22 by setting the middle thin plates 21B and 22B in the pair of left and right front-rear direction members 21 and 22 and coupling the front ends of those front-rear direction members to each other by means of the coupling member 23, this document fails to disclose or suggest a specific configuration for preventing occurrence of unnecessary deformation in crash of a vehicle, surely causing deformation of a fragile portion like the middle thin plates 21B and 22B, and exhibiting required crash performance, in a case where a pair of side members like the front-rear direction members 21 and 22 are coupled to each other by means of a suspension-arm support or a cross member in which a middle vehicle-body attachment portion can be set.

The present invention has been made through the above studies and an object of the present invention is to provide a vehicle subframe capable of preventing occurrence of unnecessary deformation in a side member and exhibiting required crash performance in frontal crash of a vehicle.

In order to achieve the above object, a first aspect of the present invention provides a vehicle subframe attached to a vehicle body, comprising: a first side member that extends in a front-rear direction of the vehicle body and in which a first front vehicle-body attachment portion on a front side in the front-rear direction and a first rear vehicle-body attachment portion on a rear side in the front-rear direction are set; a second side member that extends in the front-rear direction of the vehicle body and is opposed to the first side member in a width direction of the vehicle body, and in which a second front vehicle-body attachment portion on the front side and a second rear vehicle-body attachment portion on the rear side are set; and a first cross member that extends in the width direction and couples the first side member and the second side member to each other, wherein the first side member has a first extending portion that extends while being deflected outward on one side in the width direction as approaching from the rear side to the front side, the second side member has a second extending portion that extends while being deflected outward on the other side in the width direction as approaching from the rear side to the front side, and the vehicle subframe further comprises a second cross member that is opposed to the first cross member on the front side thereof and couples a portion of the first extending portion in which degree of outward deflection on the one side in the width direction becomes large and a portion of the second extending portion in which degree of outward deflection on the other side in the width direction becomes large to each other.

According to a second aspect of the present invention, in addition to the first aspect, a joint portion of the second cross member to the first side member has a first enlarged portion in which a length in the front-rear direction becomes longer toward the one side in the width direction, and a joint portion of the second cross member to the second side member has a second enlarged portion in which a length in the front-rear direction becomes longer toward the other side in the width direction.

According to a third aspect of the present invention, in addition to the first or second aspect, in the first enlarged portion, at least one of a wall portion on the front side and a wall portion on the rear side projects in the front-rear direction, and in the second enlarged portion, at least one of a wall portion on the front side and a wall portion on the rear side projects in the front-rear direction.

According to a fourth aspect of the present invention, in addition to any one of the first to third aspects, the vehicle subframe further comprises: a first vehicle-body attachment member that is provided on one side in the width direction on an upper side in the vertical direction of the vehicle body with respect to the first side member and the cross member to project and in which a first middle vehicle-body attachment portion between the first front vehicle-body attachment portion and the first rear vehicle-body attachment portion in the front-rear direction is set; and a second vehicle-body attachment member that is provided on the other side in the width direction on an upper side with respect to the second side member and the cross member to project and in which a second middle vehicle-body attachment portion between the second front vehicle-body attachment portion and the second rear vehicle-body attachment portion in the front-rear direction is set, wherein a joint portion of the second cross member to the first side member is arranged to be closer to the first front vehicle-body attachment portion than to the first middle vehicle-body attachment portion, and a joint portion of the second cross member to the second side member is arranged to be closer to the second front vehicle-body attachment portion than to the second middle vehicle-body attachment portion.

According to the configuration of the first aspect of the present invention, the first side member has the first extending portion that extends while being deflected outward on one side in the width direction as approaching from the rear side to the front side, and the second side member has the second extending portion that extends while being deflected outward on the other side in the width direction as approaching from the rear side to the front side. The vehicle subframe further includes the second cross member that is opposed to the first cross member on the front side thereof and couples a portion of the first extending portion in which the degree of outward deflection on the one side in the width direction becomes large and a portion of the second extending portion in which the degree of outward deflection on the other side in the width direction becomes large to each other. Accordingly, when load in frontal crash biased on one of left and right sides of a vehicle is applied to one of the first side member and the second side member in so-called offset crash or the like, it is possible to prevent the one side member from being unnecessarily deformed outward in the width direction and to transfer and distribute the crash load to the other side member.

According to the configuration of the second aspect of the present invention, the joint portion of the second cross member to the first side member has the first enlarged portion in which the length in the front-rear direction increases toward the one side in the width direction, the joint portion of the second cross member to the second side member has the second enlarged portion in which the length in the front-rear direction increases toward the other side in the width direction. Accordingly, it is possible to surely prevent the side member to which the crash load is applied from being unnecessarily deformed outward in the width direction and to surely distribute the crash load.

According to the configuration of the third aspect of the present invention, in the first enlarged portion, at least one of the wall portion on the front side and the wall portion on the rear side projects in the front-rear direction. In the second enlarged portion, at least one of the wall portion on the front side and the wall portion on the rear side projects in the front-rear direction. Accordingly, it is possible to surely couple the side members to each other to match the flexibility of the layout of the subframe and its surrounding region, prevent the side member to which the crash load is applied from being unnecessarily deformed outward in the width direction more surely, and distribute the crash load more surely.

According to the configuration of the fourth aspect of the present invention, the first vehicle-body attachment member is further included on one side in the width direction, which is provided on the upper side in the vertical direction of the vehicle body with respect to the first side member and the cross member to project and in which a first middle vehicle-body attachment portion between the first front vehicle-body attachment portion and the first rear vehicle-body attachment portion in the front-rear direction is set. Also, the second vehicle-body attachment member is further included on the other side in the width direction, which is provided on the upper side with respect to the second side member and the cross member to project and in which the second middle vehicle-body attachment portion between the second front vehicle-body attachment portion and the second rear vehicle-body attachment portion in the front-rear direction is set. The joint portion of the second cross member to the first side member is arranged to be closer to the first front vehicle-body attachment portion than to the first middle vehicle-body attachment portion, and the joint portion of the second cross member to the second side member is arranged to be closer to the second front vehicle-body attachment portion than to the second middle vehicle-body attachment portion. Accordingly, it is possible to improve the strength of attachment of the subframe to the vehicle body and the rigidity, and the load can be further distributed while the side member is further prevented from being unnecessarily deformed outward in the width direction.

BRIEF DESCRIPTION OF THE DRAWINGS

FIG. 3 is a left side view showing a configuration of the vehicle subframe according to the embodiment;

DETAILED DESCRIPTION OF THE PREFERRED EMBODIMENT

Figure 1:
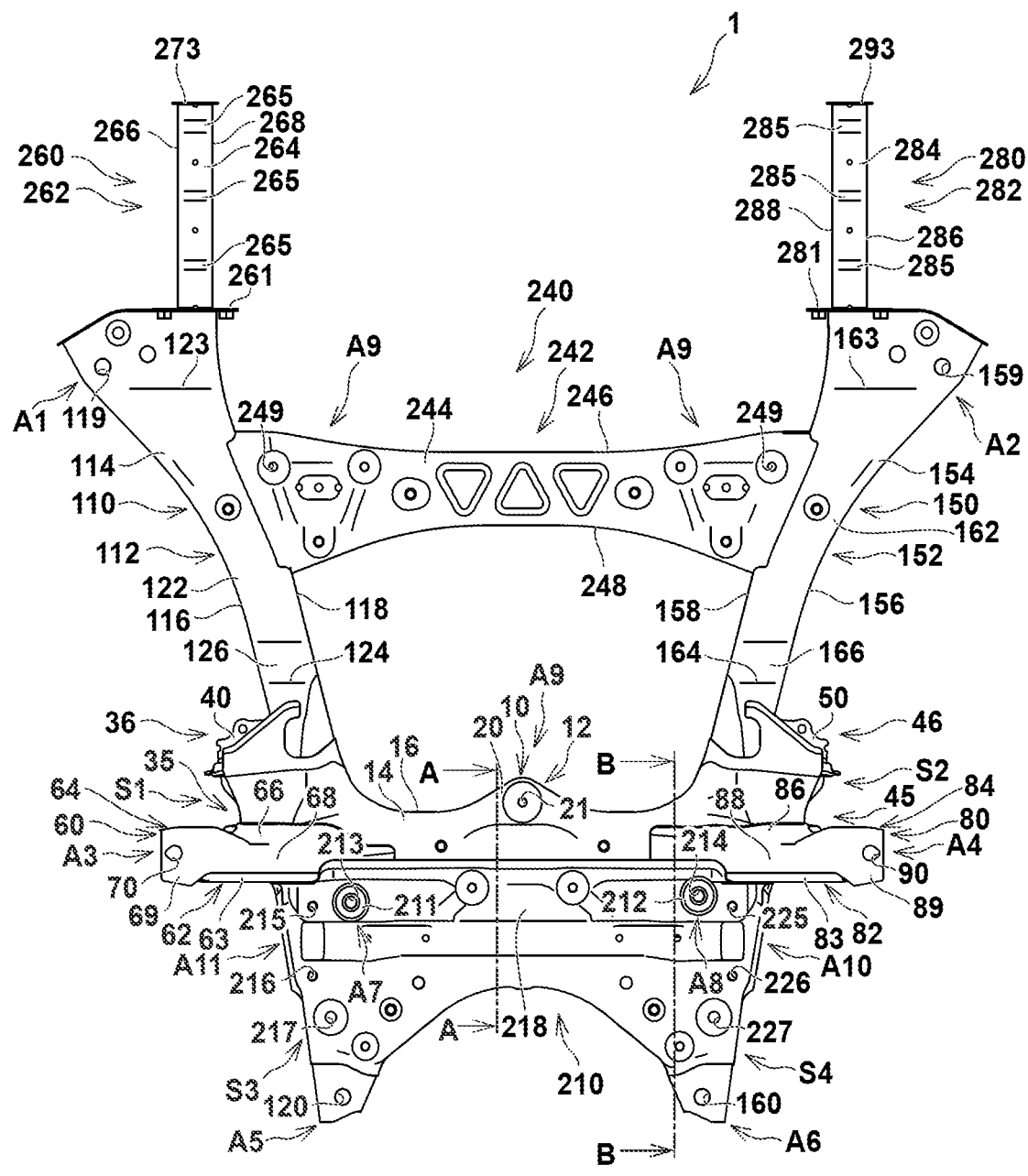
FIG. 1 is a plan view showing a configuration of a vehicle subframe according to an embodiment of the present invention.

A vehicle subframe according to an embodiment of the present invention will be explained below in detail with reference to FIGS. 1 to 8. In the drawings, an x-axis, a y-axis, and a z-axis forma triaxial orthogonal coordinate system. The positive direction of the x-axis is a right direction of a vehicle body, the positive direction of the y-axis is a front direction of the vehicle body, and the positive direction of the z-axis is an upper direction of the vehicle body. An x-axis direction is referred to as a width direction or a lateral direction, a y-axis direction is referred to as a front-rear direction, and a z-axis direction is referred to as a vertical direction in some cases.

Figure 2:
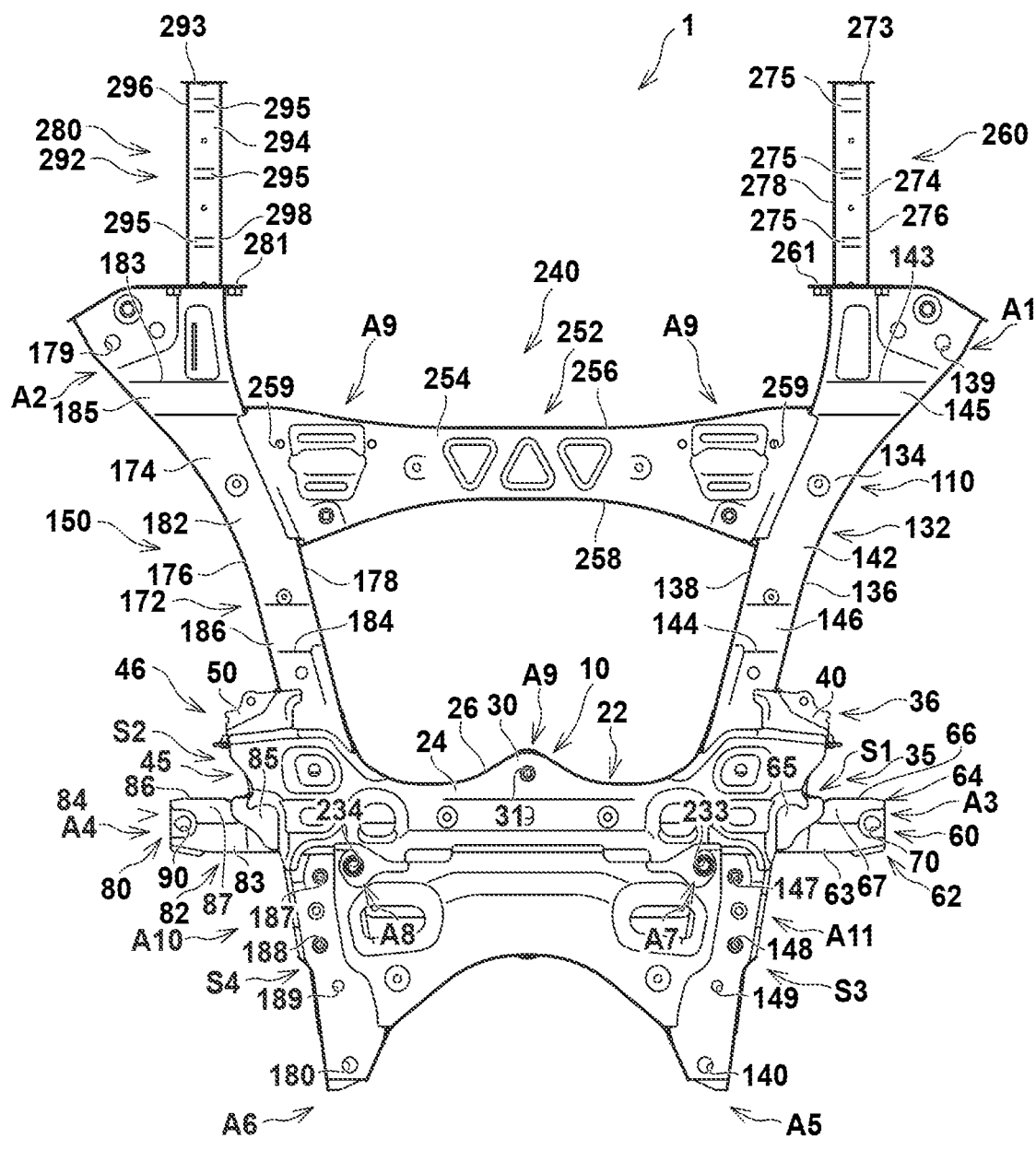
FIG. 2 is a bottom view showing a configuration of the vehicle subframe according to the embodiment.
Figure 4A:
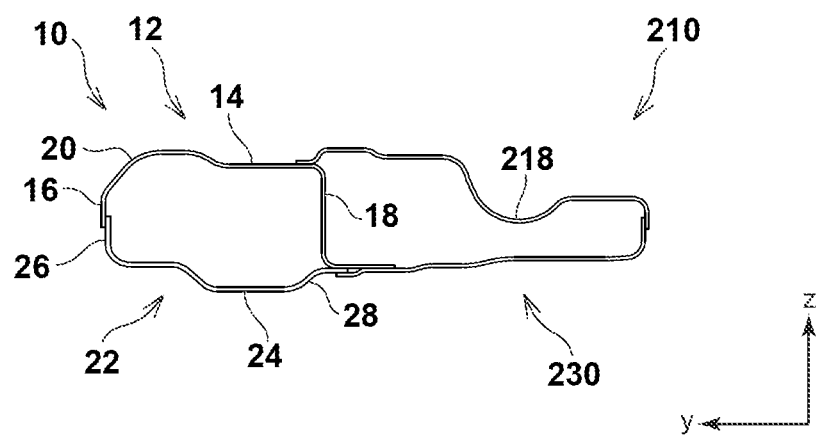
FIG. 4A is an A-A cross-sectional view of FIG. 1.
Figure 4B:
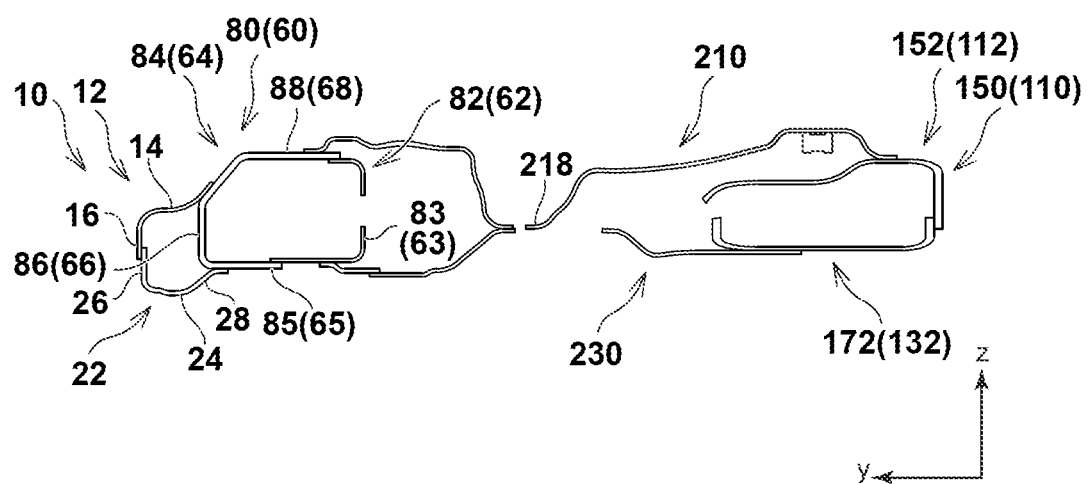
FIG. 4B is a B-B cross-sectional view of FIG. 1.
Figure 5A:
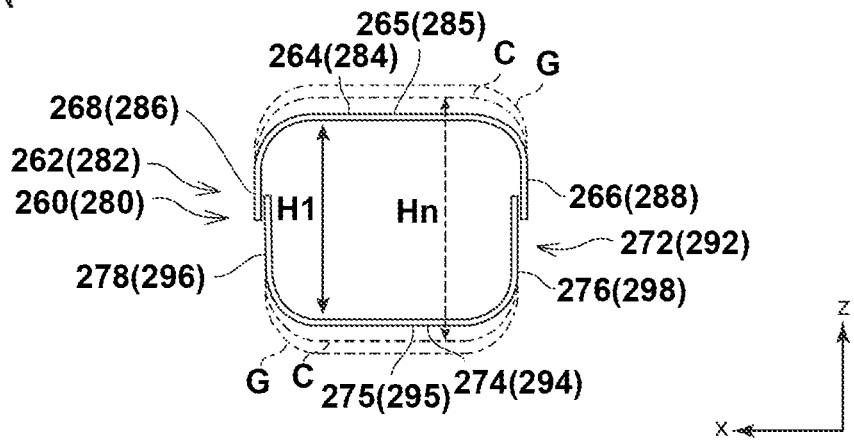
FIG. 5A is a C-C cross-sectional view of FIG. 3.
Figure 5B:
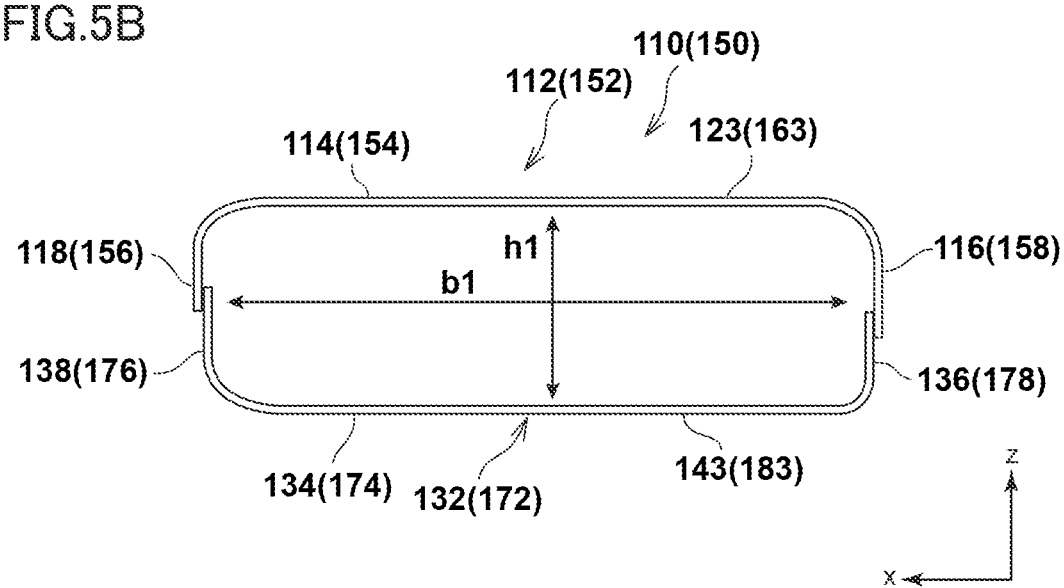
FIG. 5B is an F-F cross-sectional view of FIG. 3.
Figure 5C:
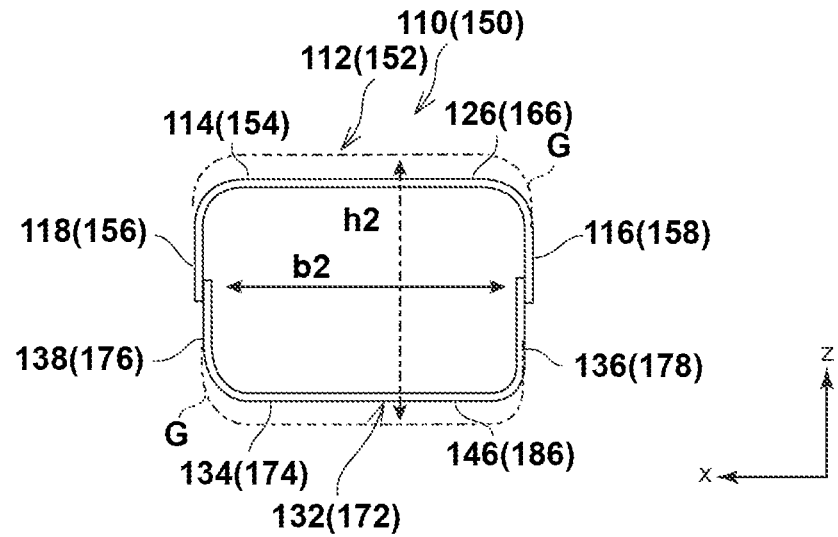
FIG. 5C is a G-G cross-sectional view of FIG. 3.
Figure 6A:
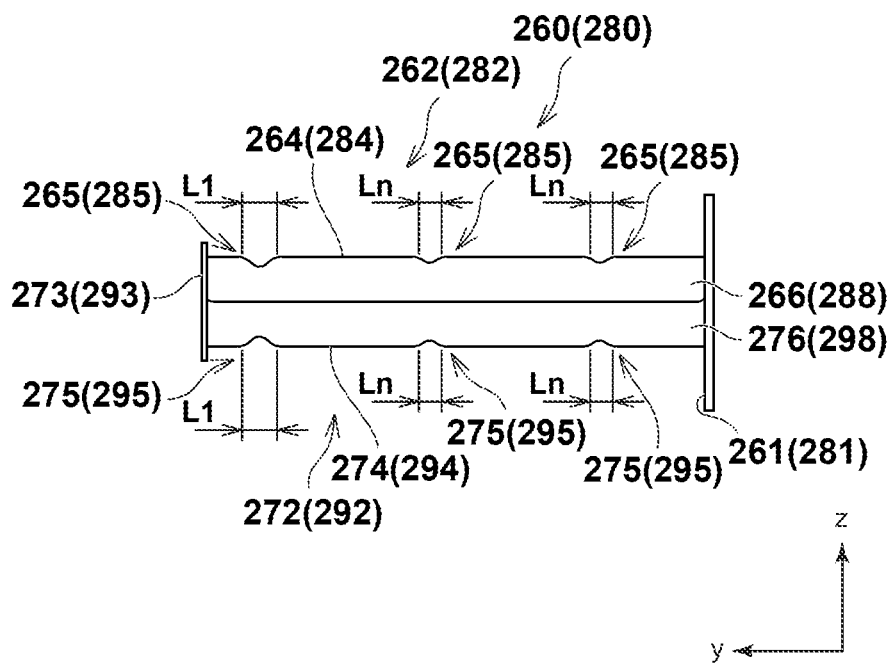
FIG. 6A is a partially enlarged left side view showing a configuration of a crush box of the vehicle subframe according to the embodiment.
Figure 6B:
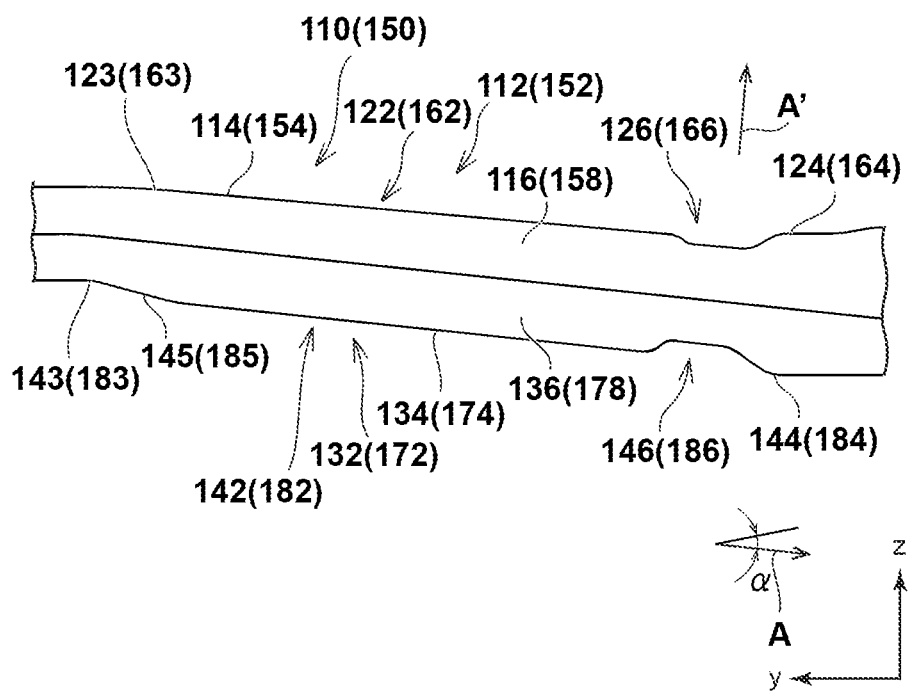
FIG. 6B is a partially enlarged left side view showing a configuration of a side member of the vehicle subframe according to the embodiment, both corresponding to FIG. 3 in terms of position.
Figure 7A:
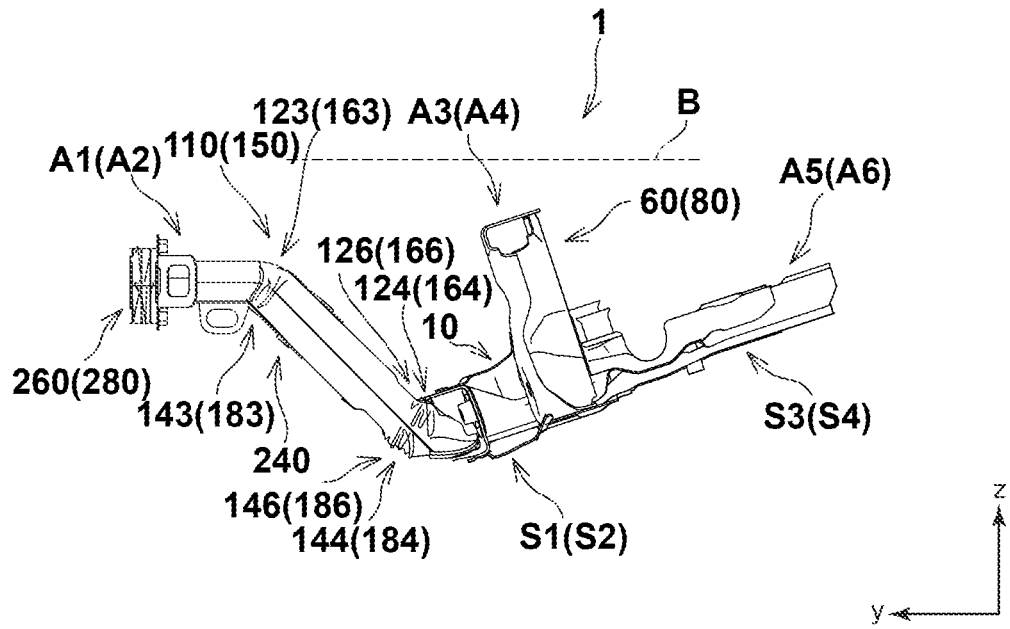
FIG. 7A is a schematic left side view corresponding to FIG. 3, showing the state of deformation of the vehicle subframe according to the embodiment, when receiving crash load applied thereto from the front side to the rear side in frontal crash of a vehicle and is deformed.
Figure 7B:
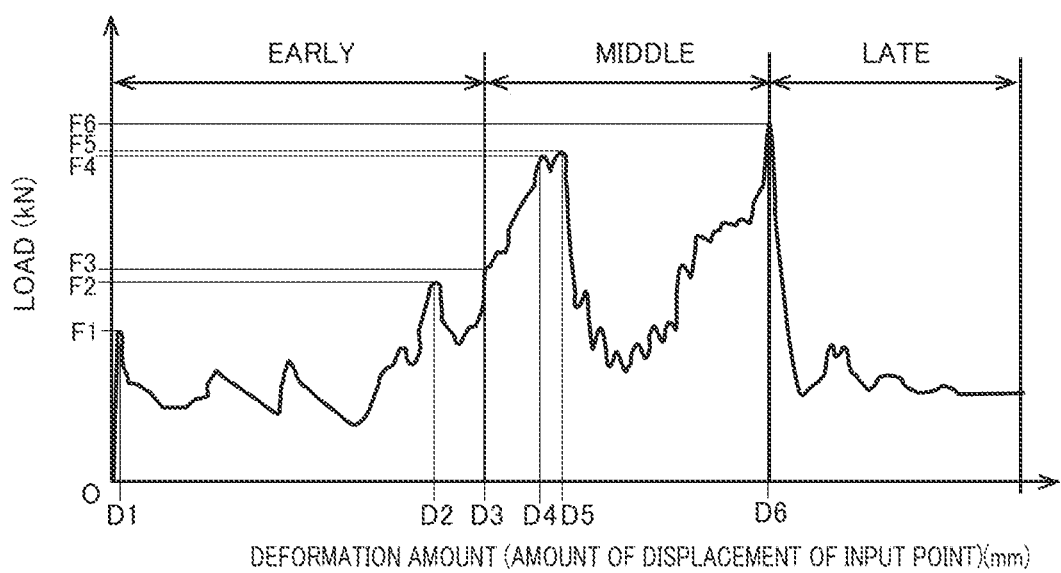
FIG. 7B is a schematic diagram showing, when the vehicle subframe according to the embodiment receives crash load applied from the front side to the rear side in frontal crash of the vehicle and is deformed, change of load received by the vehicle subframe with respect to the amount of deformation of the vehicle subframe in the front-rear direction.
Figure 8A:
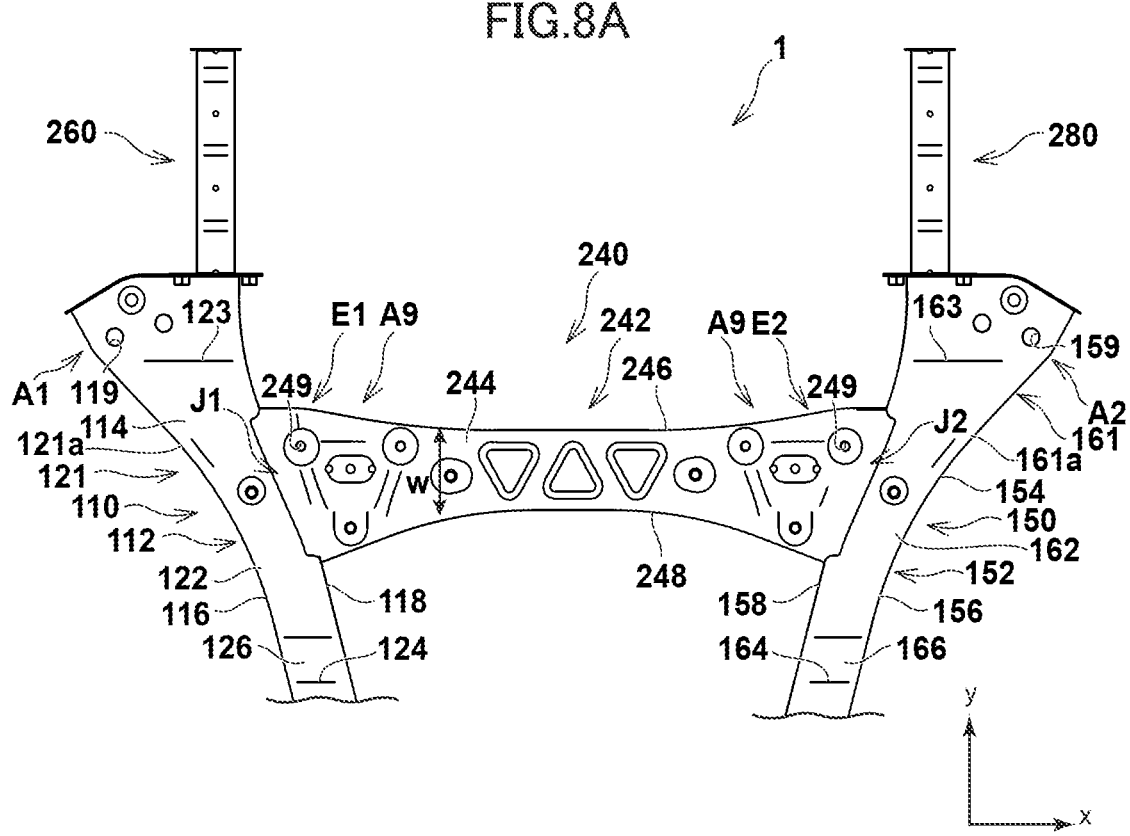
FIG. 8A is a partial plan view of the vehicle subframe according to the embodiment.
Figure 8B:
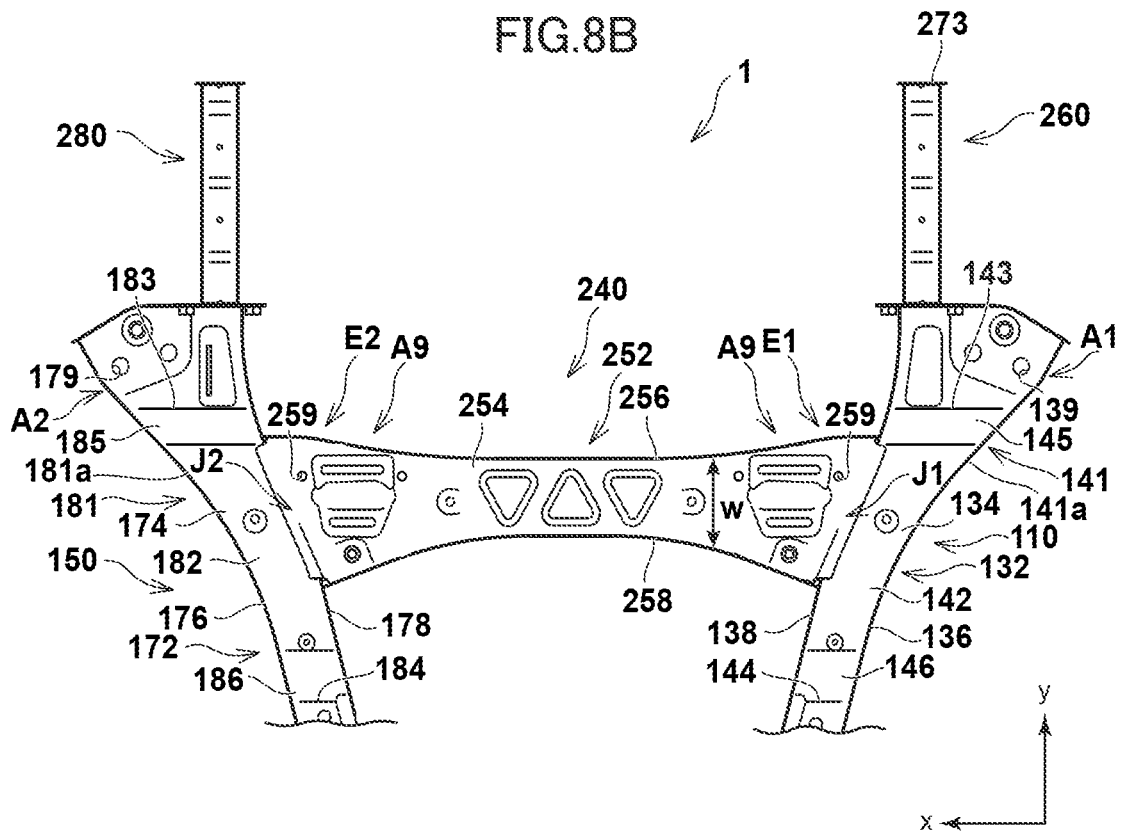
FIG. 8B is a partial bottom view of the vehicle subframe according to the embodiment.

FIGS. 1 to 3 are a plan view, a bottom view, and a left side view showing a configuration of a vehicle subframe according to the present embodiment, respectively. FIGS. 4A and 4B are an A-A cross-sectional view and a B-B cross-sectional view of FIG. 1, each being a vertical cross-section taken along a plane parallel to a y-z plane formed by the y-axis and the z-axis. FIGS. 5A, 5B, and 5C are a C-C cross-sectional view, an F-F cross-sectional view, and a G-G cross-sectional view of FIG. 3, each being a vertical cross-section taken along a plane parallel to an x-z plane formed by the x-axis and the z-axis. FIG. 6A is a partially enlarged left side view showing a configuration of a crush box of the vehicle subframe according to the present embodiment, and FIG. 6B is a partially enlarged left side view showing a configuration of a side member of the vehicle subframe according to the present embodiment, both corresponding to FIG. 3 in terms of position. FIG. 7A is a schematic left side view corresponding to FIG. 3, showing the state of deformation of the vehicle subframe according to the present embodiment, when receiving crash load (impulsive force) applied thereto from the front side to the rear side in frontal crash of a vehicle and is deformed. FIG. 7B is a schematic diagram showing, when the vehicle subframe according to the present embodiment receives crash load applied from the front side to the rear side in frontal crash of the vehicle and is deformed, change of load (vertical axis) received by the vehicle subframe with respect to the amount of deformation (horizontal axis) of the vehicle subframe in the front-rear direction. In FIG. 7B, the slope of load is small when the amount of deformation can increase easily (change with time is large), for example, because the subframe is being deformed, and the slope of load is large when it is hard for the amount of deformation to increase (change with time is small) before or after deformation. FIG. 8A is a partial plan view of the vehicle subframe according to the present embodiment, and FIG. 8B is a partial bottom view of the vehicle subframe according to the present embodiment. In FIGS. 3, 4B, 5A to 5C, 6A, 6B and 7A, either a reference sign of a left constituent element or a reference sign of a right constituent element is written in parenthesis for the sake of convenience. In FIGS. 3 and 7A, a portion of a vehicle body is shown with a virtual line B for the sake of convenience. In FIG. 5A, an outline in the D-D cross-sectional view and the E-E cross-sectional view of FIG. 3 is schematically shown with a virtual line C. Further, cross-sections in FIGS. 5A, 5B, and 5C are typically rectangular, and dimensions of, for example, h1 and H1 are shown as the dimensions between plates for the sake of convenience.

As shown in FIGS. 1 to 8, a subframe 1 is attached to a vehicle body, for example, a front side frame extending in a front-rear direction in a housing that accommodates one or both of an internal combustion engine and an electric motor that are driving sources of a vehicle such as an automobile, a transmission, and a reduction gear required for the driving source, and supports a required one of the driving source, the transmission, and the reduction gear, and a suspension arm, for example (all not shown). This subframe 1 typically has a symmetrical (plane-symmetrical) shape with respect to a plane that is parallel to a y-z plane and passes through a center line extending in the front-rear direction in the center in the width direction of the vehicle body.

In the subframe 1, six portions are set as portions attached to the vehicle body which include a first vehicle-body attachment portion A1, a second vehicle-body attachment portion A2, a third vehicle-body attachment portion A3, a fourth vehicle-body attachment portion A4, a fifth vehicle-body attachment portion A5, and a sixth vehicle-body attachment portion A6, and four portions are set as portions supporting the suspension arm which include a first supporting portion S1, a second supporting portion S2, a third supporting portion S3, and a fourth supporting portion S4. The details of these portions will be described later.

Further, attachment portions for attaching various external-force application parts are set in the subframe 1. Examples of these attachment portions include a steering-gearbox left attachment portion A7, a steering-gearbox right attachment portion A8, a plurality of mount attachment portions A9 for attaching a required one of the driving source, the transmission, and the reduction gear, a stabilizer left attachment portion A10, and a stabilizer right attachment portion A11. The details of these portions will be described later.

Specifically, the subframe 1 mainly includes a cross member 10, a left attachment member 60, a right attachment member 80, a pair of side members including a left side member 110 and a right side member 150, a rear upper member 210, a rear lower member 230, a front cross member 240, a left crush box 260, and a right crush box 280. The cross member 10 extends in the width direction and defines a closed cross-section continuously in the width direction. The left attachment member 60 is coupled to the cross member 10 and the like, and is arranged on a left-end side of the cross member 10. The right attachment member 80 is coupled to the cross member 10 and the like, and is arranged on a right-end side of the cross member 10. The left side member 110 and the right side member 150 are coupled to the cross member 10 and to the left and right attachment members 60 and 80, respectively, extend in the front-rear direction, and are opposed to each other in the width direction. The rear upper member 210 is coupled to the cross member 10, the left and right attachment members 60 and 80, and the left and right side members 110 and 150, and is arranged on the rear side of the cross member 10. The rear lower member 230 is coupled to the cross member 10, the left and right attachment members 60 and 80, the left and right side members 110 and 150, and the rear upper member 210 and is arranged on a lower side of the rear upper member 210 to be opposed to the rear upper member 210 in the vertical direction. The front cross member 240 extends in the width direction, is arranged on the front side of the cross member 10 to be opposed thereto in the front-rear direction, and couples the left side member 110 and the right side member 150 to each other. The left crush box 260 is coupled to the front end of the left side member 110 and extends forward from the front end of the left side member 110. The right crush box 280 is coupled to the front end of the right side member 150 and extends forward from the front end of the right side member 150. These members are each typically obtained by press-forming of a flat-plate member such as a steel plate. Overlapping portions or butted portions of these members are in contact with each other in a corresponding manner and are integrated with each other by being welded by plug welding, arc welding, or the like, whereby the subframe 1 has a closed cross-sectional shape basically. These members may be obtained by casting a metal material such as an aluminum cast material, for example. The rear upper member 210, the rear lower member 230, the left crush box 260, and the right crush box 280 can be selectively omitted as appropriate, if they are not required in terms of part arrangement, strength including collision strength, or the like. However, a configuration including these members is described as an example in the present embodiment.

The cross member 10 includes a lateral upper member 12 extending in the width direction and a lateral lower member 22 that is arranged on a lower side of the lateral upper member 12 to be opposed thereto in the vertical direction, extends in the width direction, and is in contact with the lateral upper member 12 and is integrated therewith by being welded typically by arc welding or the like. The cross member 10 defines a closed cross-section (a vertical closed cross-section) in a plane parallel to a y-z plane continuously in the width direction by the lateral upper member 12 and the lateral lower member 22 that are integrated with each other.

In detail, the lateral upper member 12 is a plate member that is typically formed from a single plate member such as a steel plate and is convex upward basically, and has an upper wall portion 14, a front vertical wall portion 16, and a rear vertical wall portion 18 that is arranged on the rear side of the front vertical wall portion 16 to be opposed to the front vertical wall portion 16 in the front-rear direction. The upper wall portion 14 extends over the entire length in the width direction of the lateral upper member 12, whereas the front vertical wall portion 16 and the rear vertical wall portion 18 may not be provided in a part of the lateral upper member 12 in the width direction.

The upper wall portion 14 connects the front vertical wall portion 16 and the rear vertical wall portion 18 to each other and has a projection 20 that projects forward in a middle portion in the width direction of the upper wall portion 14. A through hole 21 is formed in the upper wall portion 14 at a position in the width direction corresponding to the projection 20, which penetrates through the upper wall portion 14.

The lateral lower member 22 is a plate member that is typically formed from a single plate member such as a steel plate and is convex downward basically, and has a bottom wall portion 24, a front vertical wall portion 26, and a rear vertical wall portion 28 that is arranged on the rear side of the front vertical wall portion 26 to be opposed to the front vertical wall portion 26 in the front-rear direction. Although the bottom wall portion 24, the front vertical wall portion 26, and the rear vertical wall portion 28 are provided to extend over the entire length in the width direction of the lateral lower member 22, the front vertical wall portion 26 and the rear vertical wall portion 28 may not be provided in a part of the lateral lower member 22 in the width direction.

The bottom wall portion 24 has a projection 30 that projects forward in a middle portion in the width direction to correspond to the projection 20 of the lateral upper member 12. A through hole 31 penetrating through the bottom wall portion 24 is formed in the bottom wall portion 24 at a position in the width direction corresponding to the projection 30, to correspond to the through hole 21 of the lateral upper member 12. A collar member (not shown) that is typically a metal tubular member is fixed inside the cross member 10 to correspond to these through holes 21 and 31.

A left opening end 35 is provided on the left-end side of the cross member 10 for attaching a left suspension member (not shown), and a right opening end 45 is provided on the right-end side of the cross member 10 for attaching a right suspension member (not shown). That is, the left and right opening ends 35 and 45 are set on both end sides in the width direction of the cross member 10.

Since the front vertical wall portion 16 and the rear vertical wall portion 18 of the lateral upper member 12 and the front vertical wall portion 26 and the rear vertical wall portion 28 of the lateral lower member 22 are substantially not present at the left end of the cross member 10, the left opening end 35 is defined as a rectangular opening end in left side view which is surrounded by the upper wall portion 14 of the lateral upper member 12, the bottom wall portion 24 of the lateral lower member 22, a vertical wall portion 38 of a left support member 36, and a left front member 64 of the left attachment member 60. In the left opening end 35, the vertical wall portion 38 of the left support member 36 and the left front member 64 of the left attachment member 60 are both flat plates and are opposed to each other in the front-rear direction. In the vertical wall portion 38 that is one of the opposed portions, a through hole 41 is formed to penetrate therethrough, and a nut 42 is fixed to the through hole 41 to stand forward from the vertical wall portion 38. In the left front member 64 of the left attachment member 60 which is opposed to the vertical wall portion 38 in the front-rear direction, a through hole 43 penetrating through the left front member 64 is formed to correspond to the through hole 41 in the vertical wall portion 38. The left support member 36 is a member typically formed from a single plate member such as a steel plate and has the vertical wall portion 38 and a flange portion 40 that is bent up from the vertical wall portion 38 on at least the upper side and the lower side of the vertical wall portion 38. The flange portion 40 is laid on the lower side of the upper wall portion 14 of the lateral upper member 12 of the cross member 10 and on the upper side of the bottom wall portion 24 of the lateral lower member 22 to be in contact therewith, and is integrated therewith by being welded typically by arc welding or the like.

The configuration related to the right opening end 45 defined at the right end of the cross member 10 is symmetrical with the configuration related to the left opening end 35 with respect to a plane that is parallel to a y-z plane and passes through a center line extending in the front-rear direction in the center in the width direction of a vehicle body, and therefore the detailed descriptions are omitted. The right opening end 45 is a rectangular opening end in right side view which is surrounded by the upper wall portion 14 of the lateral upper member 12, the bottom wall portion 24 of the lateral lower member 22, a vertical wall portion 48 of a right support member 46, and a right front member 84 of the right attachment member 80 and has a through hole 51, a nut 52, and a through hole 53 respectively corresponding to the through hole 41, the nut 42, and the through hole 43 of the left opening end 35. The right support member 46 is a member typically formed from a single plate member such as a steel plate and has the vertical wall portion 48 and the flange portion 50 that is bent up from the vertical wall portion 48 on at least the upper side and the lower side of the vertical wall portion 48. The flange portion 50 is laid on the lower side of the upper wall portion 14 of the lateral upper member 12 of the cross member 10 and on the upper side of the bottom wall portion 24 of the lateral lower member 22 to be in contact therewith and is integrated therewith by being welded typically by arc welding or the like.

Further, the left attachment member 60 and the right attachment member 80 as a pair of attachment members for attaching the subframe 1 to a vehicle body are provided on the left and right end sides in the width direction of the cross member 10 to correspond to the left opening end 35 and the right opening end 45, respectively.

The left attachment member 60 includes a left rear member 62 arranged on the left-end side of the cross member 10 to project basically upward and the left front member 64 that is arranged on the left-end side of the cross member 10 and on the front side of the left rear member 62 and projects upward basically. The left rear member 62 and the left front member 64 are each typically obtained by press-forming of one flat-plate member such as a steel plate and are integrated with each other to close their openings by being welded by arc welding or the like. The left attachment member 60 thus has a closed cross-sectional shape. The left rear member 62 and the left front member 64 may not be two separate plate members such as steel plates but may be formed from a single plate member such as a steel plate, as necessary, although forming of those members becomes complicated.

In detail, the left front member 64 includes a bottom wall portion 65, a front vertical wall portion 66, a left vertical wall portion 67, an inclined wall portion 68, and an upper wall portion 69 that are wall portions on the lower side, the front side, the left side, the right side, and the upper side, respectively. The bottom wall portion 65 is in contact with the upper side of the bottom wall portion 24 of the lateral lower member 22 of the cross member 10 and is welded thereto by plug welding, arc welding, or the like. The front vertical wall portion 66 is connected to the bottom wall portion 65, the left vertical wall portion 67, the inclined wall portion 68, and the upper wall portion 69. The lower part of the front vertical wall portion 66 forms a flat plate portion opposed in the front-rear direction to a flat plate portion of the vertical wall portion 38 of the left support member 36 which is provided with the through hole 41, and is provided with the through hole 43. The upper part of the front vertical wall portion 66 above the through hole 43 is in contact with each of the upper wall portion 14 of the lateral upper member 12 of the cross member 10 and a left upper member 112 of the left side member 110 and is welded thereto by arc welding or the like. The left vertical wall portion 67 is connected to the bottom wall portion 65, the front vertical wall portion 66, and the upper wall portion 69. The inclined wall portion 68 is connected to the front vertical wall portion 66 and the upper wall portion 69. The lower part of the inclined wall portion 68 is in contact with each of the upper wall portion 14 of the lateral upper member 12 of the cross member 10, the left side member 110 (at least one of the left upper member 112 and a left lower member 132), and the left front end of the rear upper member 210 and is welded thereto by arc welding or the like. A through hole 70 through which a vehicle-body attachment bolt (not shown) is to be inserted is formed in the upper wall portion 69. That is, the left front member 64 is integrated with the cross member 10, the left side member 110, and the rear upper member 210. The hole shape of the through hole 70 may be a shape different from a circular shape, for example, an oval shape, a square shape, or a droplet shape, or may have a notch formed in the peripheral wall of the through hole 70 in order to apply force to the upper wall portion 69 around the through hole 70 from the bolt inserted into and fastened to the through hole 70, cause deformation of the through hole 70, and cause the bolt to be detached from the through hole 70, thereby allowing the left attachment member 60 to deviate to the lower side when the subframe 1 is deformed by crash load applied from the front side to the rear side in frontal crash of a vehicle.

The left rear member 62 has a wall portion 63 that is in contact with each wall portion of the left front member 64 on the rear side of the left front member 64 and is welded thereto by arc welding or the like. The lower end of the wall portion 63 is in contact with the upper side of the bottom wall portion 24 of the lateral lower member 22 of the cross member 10, and the overlapping portions are welded by arc welding or the like. Portions of the wall portion 63 above that lower end, which are in contact with the left upper member 112 of the left side member 110 and the left front end of the rear upper member 210, respectively, are welded by arc welding or the like. In this manner, the left rear member 62 is integrated with the cross member 10, the left side member 110, and the rear upper member 210.

The configuration related to the right attachment member 80 arranged at the right-end side of the cross member 10 is symmetrical with the configuration related to the left attachment member 60 with respect to a plane that is parallel to a y-z plane and passes through a center line extending in the front-rear direction in the center in the width direction of a vehicle body, and therefore the detailed descriptions are omitted. The right attachment member 80 has a right rear member 82, a wall portion 83, the right front member 84, a bottom wall portion 85, a front vertical wall portion 86, a right vertical wall portion 87, an inclined wall portion 88, an upper wall portion 89, and a through hole 90 to respectively correspond to the left rear member 62, the wall portion 63, the left front member 64, the bottom wall portion 65, the front vertical wall portion 66, the left vertical wall portion 67, the inclined wall portion 68, the upper wall portion 69, and the through hole 70 of the left attachment member 60.

The left side member 110 includes the left upper member 112 and the left lower member 132. The left upper member 112 is a plate member that is basically convex upward, is in contact with the lower side of the upper wall portion 14 of the lateral upper member 12 of the cross member 10, and extends in the front-rear direction on the left side of the cross member 10. The left lower member 132 is a plate member that is arranged on the lower side of the left upper member 112 to be opposed thereto in the vertical direction, is basically convex downward, is in contact with the upper side of the bottom wall portion 34 of the lateral lower member 22 of the cross member 10, and extends in the front-rear direction. In the left upper member 112 and the left lower member 132, overlapping portions or butted portions are welded typically by arc welding or the like while being in contact with each other in a corresponding manner, so that the left upper member 112 and the left lower member 132 are integrated with each other. In the left side member 110, the left upper member 112 and the left lower member 132 may not be two separate plate members such as steel plates but may be formed from a single plate member such as a steel plate, or a tubular member, as necessary, although forming of those members becomes complicated.

In detail, the left upper member 112 has an upper wall portion 114, a left wall portion 116, and a right wall portion 118 arranged on the right side of the left wall portion 116 and opposed to the left wall portion 116 in the width direction. The upper wall portion 114 connects the left wall portion 116 and the right wall portion 118 to each other and has through holes 119 and 120 at its front end and its rear end, respectively. The left upper member 112 has a left upper deflected portion 121 and an inclined portion 122 between the front end and the rear end. The left upper deflected portion 121 is a middle portion of the left upper member 112, in which the left wall portion 116, the right wall portion 118, and the upper wall portion 114 associated with them extend in the front-rear direction from the rear end of the left upper member 112 at which the through hole 120 is provided to the front rear end at which the through hole 119 is provided while being deflected to the left with respect to the front-rear direction in top view. In particular, the left upper deflected portion 121 has a left upper deflection-increasing portion 121a on the front side of the third vehicle-body attachment portion A3 set in the left attachment member 60. In the left upper deflection-increasing portion 121a, the degree of deflection of the left wall portion 116 and the associated upper wall portion 114 to the left increases (in a case where the left wall portion 116 is a curved surface, the radius of curvature R becomes small and in a case where the left wall portion 116 is a bent surface, a bending angle of deflection with respect to the front-rear direction becomes large). However, as for the right wall portion 118, the degree of deflection to the left does not increase as compared with the left wall portion 116, even in the left upper deflection-increasing portion 121a. The inclined portion 122 is a middle portion of the left upper member 112 between the front end and the rear end thereof in side view, the front end and the rear end having the through hole 119 and the through hole 120, respectively, and both extending in the front-rear direction without being inclined. That is, the inclined portion 122 is a middle portion that linearly extends, while descending, toward the rear side in such a manner that the descent starts at a front bent portion 123 and ends at a rear bent portion 124 in the upper wall portion 114. An inclination angle α of the descent of the inclined portion 122 with respect to the front-rear direction is typically set to a fixed value that is equal to or smaller than 15° and is larger than 0°. The left upper member 112 has a concave portion 126 between the rear bent portion 124 of the inclined portion 122 and a predetermined position on the front side of the rear bent portion 124, the concave portion 126 being formed by recessing a general portion G of the upper wall portion 114 to be convex toward the left lower member 132 in a direction A' perpendicular to an extending direction (an inclination direction) A of the inclined portion 122 inclined at the inclination angle α. The concave portion 126 is set to extend over a predetermined length in the inclination direction A at the rear end of the inclined portion 122. The position of the rear end of the concave portion 126 which is an end closer to the rear bent portion 124 is set in such a manner that the distance from that rear end to the rear bent portion 124 is smaller than the distance from that rear end to the front bent portion 123, and is typically set to be coincident with the position of the rear bent portion 124 (the position of a bending line in a case where the rear bent portion 124 is a bent portion and is a position in a curved range in a case where the rear bent portion 124 is a curved portion). A transition surface between the general portion G in which the upper wall portion 114 is not recessed and the concave portion 126 may extend beyond the rear bent portion 124 toward the rear end of the left upper member 112. The inclination angle α is preferably set to a fixed value equal to or smaller than 10° from a viewpoint of stably causing crushing of the concave portions 126 and 146, the details of which will be described later, when those portions are crushed in the front-rear direction.

The left lower member 132 has a bottom wall portion 134, a left wall portion 136, and a right wall portion 138 arranged on the right side of the left wall portion 136 and opposed to the left wall portion 136 in the width direction. The bottom wall portion 134 connects the left wall portion 136 and the right wall portion 138 to each other and has through holes 139 and 140 at its front end and its rear end, respectively. The left lower member 132 has a left lower deflected portion 141 and an inclined portion 142 between the front end and the rear end. The left lower deflected portion 141 is a middle portion of the left lower member 132, in which the left wall portion 136, the right wall portion 138, and the bottom wall portion 134 associated with them extend in the front-rear direction from the rear end of the left lower member 132 at which the through hole 140 is provided to the front end at which the through hole 139 is provided while being deflected to the left with respect to the front-rear direction in top view. In particular, the left lower deflected portion 141 has a left lower deflection-increasing portion 141a on the front side of the third vehicle-body attachment portion A3 set in the left attachment member 60. In the left lower deflection-increasing portion 141a, the degree of deflection of the left wall portion 136 and the associated bottom wall portion 134 to the left increases (in a case where the left wall portion 136 is a curved surface, the radius of curvature R becomes small and in a case where the left wall portion 136 is a bent surface, a bending angle of bending with respect to the front-rear direction becomes large), as with the left wall portion 116, the right wall portion 118, and the associated upper wall portion 114 of the left upper member 112. However, as for the right wall portion 138, the degree of deflection to the left does not increase as compared with the left wall portion 136, even in the left lower deflection-increasing portion 141a. The inclined portion 142 is a middle portion of the left lower member 132 between the front end and the rear end thereof in side view, the front end and the rear end having the through hole 139 and the through hole 140, respectively, and both extending in the front-rear direction without being inclined. That is, the inclined portion 142 is a middle portion that linearly extends while descending toward the rear side at the inclination angle α in parallel to the inclination direction A in such a manner that the descent starts at a front bent portion 143 and ends at a rear bent portion 144 in the bottom wall portion 134. The inclined portion 142 may include a steeply inclined portion 145 that continues to the front bent portion 143 on the rear side thereof and descends at an inclination angle larger than the inclination angle α. The left lower member 132 has a concave portion 146 between the rear bent portion 144 of the inclined portion 142 and a predetermined position on the front side of the rear bent portion 144, the concave portion 146 being formed by recessing a general portion G of the bottom wall portion 134 to be convex toward the left upper member 112 in the direction A'. The concave portion 146 and the concave portion 126 of the left upper member 112 are opposed to each other in the direction A'. That is, a portion of the concave portion 146 in which the bottom wall portion 134 is recessed and a portion of the concave portion 126 of the left upper member 112 in which the upper wall portion 114 is recessed typically have such a positional relation that those are parallel to each other, and have the same contour shape as each other and overlap without protruding when viewed in the direction A'. The bottom wall portion 134 has through holes 147, 148, and 149 between the rear bent portion 144 and the through hole 140 in the front-rear direction. The through holes 139 and 140 are arranged on the lower side of the through holes 119 and 120 of the left upper member 112 to be opposed thereto in the vertical direction, respectively. In the left upper member 112, through holes (not shown) are formed on the upper side of the through holes 147, 148, and 149 to be opposed thereto in the vertical direction, respectively. To correspond to these through holes, collar members (not shown) that are typically metal tubular members are fixed inside the left side member 110.

In the left side member 110, the front bent portions 123 and 143, the rear bent portions 124 and 144, and the concave portions 126 and 146 serve as fragile portions when the subframe 1 is deformed by crash load applied from the front side to the rear side in frontal crash of a vehicle. More specifically, first, the concave portions 126 and 146 start to be crushed in the front-rear direction by application of this crash load. When the concave portions 126 and 146 are crushed and shortened to a length that is shorter than, for example, about 20% to 30% of their original entire length in the front-rear direction, those portions are substantially completely crushed, and bending deformation of the front bent portions 123 and 143 in which they become convex upward starts. At the same time, the rear bent portions 124 and 144 start to be deformed to be bent from the concave portions 126 and 146 that have been crushed and shortened in the manner described above as start points of bending, in such a manner that they become convex downward. At the end of application of the crash load, a bent state is formed in which two sides formed by bending of each of the front bent portions 123 and 143 and the rear bent portions 124 and 144 come close to each other. Typically, the materials and the plate thicknesses of the left upper member 112 and the left lower member 132 are set to be the same as each other and, when the cross-sectional area of a vertical cross section of each of the front bent portions 123 and 143 shown in FIG. 5B, the cross-sectional area of a vertical cross section of each of the rear bent portions 124 and 144 shown in FIG. 5C with a virtual line G, and the cross-sectional area of a vertical cross section of each of the concave portions 126 and 146 shown in FIG. 5C are compared with one another, the cross-sectional area of the concave portions 126 and 146 is set to be the smallest. In addition, the concave portions 126 and 146 extend over a predetermined length in the inclination direction A.

Therefore, the concave portions 126 and 146 start to be crushed first. Next, as for the front bent portions 123 and 143 and the rear bent portions 124 and 144 that are arranged in turn in the front-rear direction via the inclined portions 122 and 142, a width (a length in the width direction) b1 of the vertical cross section of each of the front bent portions 123 and 143 is much larger than a width b2 of the vertical cross section of each of the rear bent portions 124 and 144. However, a height (a length in the vertical direction) h1 is set to be lower than a height h2 of the vertical cross section of each of the rear bent portions 124 and 144 by a predetermined length to make the bending strength of the front bent portions 123 and 143 and the bending strength of the rear bent portions 124 and 144 equivalent to each other. Therefore, bending deformation of the front bent portions 123 and 143 in which they become convex upward and bending deformation of the rear bent portions 124 and 144 in which they become convex downward start substantially at the same time. At this time, the start points of bending in which the rear bent portions 124 and 144 become convex downward are the concave portions 126 and 146 that each have been crushed and shortened to a predetermined length in a vertical cross section having a height lower than the vertical cross section of each of the rear bent portions 124 and 144 and that are located on the front side of the rear bent portions 124 and 144 to be adjacent thereto, respectively. Further, in a case where the inclined portion 142 includes the steeply inclined portion 145 that continues to the front bent portion 143, bending deformation in which the front bent portions 123 and 143 become convex upward is more prompted. The materials and/or the plate thicknesses may be different between the left upper member 112 and the left lower member 132, as necessary.

The left side member 110 is welded to the left attachment member 60. In addition, the left upper member 112 of the left side member 110 is welded to the front side of the front vertical wall portion 16 of the lateral upper member 22 of the cross member 10 typically by arc welding or the like, and the left lower member 132 is in contact with the upper side of the bottom wall portion 24 of the lateral lower member 22 of the cross member 10 and is welded thereto by plug welding, arc welding, or the like. In this manner, the left side member 110 is integrated with the cross member 10. Further, the left upper member 112 is in contact with the left rear end of the rear upper member 210 and is welded thereto by arc welding or the like, and the left lower member 132 is in contact with the left end of the rear lower member 230 and is welded thereto by arc welding or the like, whereby the left side member 110 is integrated with the rear upper member 210 and the rear lower member 230. Although each of the left upper member 112 and the left lower member 132 is formed by a single plate member such as a steel plate, it may be formed by a plurality of plate members such as steel plates, which are separated from each other in the front-rear direction, as necessary. The plural plate members may have different thicknesses from each other.

The configuration related to the right side member 150 arranged on the right side of the left side member 110 to be opposed thereto in the width direction is symmetrical with the configuration related to the left side member 110 with respect to a plane that is parallel to a y-z plane and passes through a center line extending in the front-rear direction in the center in the width direction of a vehicle body, and therefore the detailed descriptions are omitted. The configuration related to the right side member 150 includes a right upper member 152, an upper wall portion 154, a right wall portion 156, a left wall portion 158, through holes 159 and 160, a right upper deflected portion 161, a right upper deflection-increasing portion 161a, an inclined portion 162, a front bent portion 163, a rear bent portion 164, a concave portion 166, through holes 167, 168, and 169, a right lower member 172, a bottom wall portion 174, a right wall portion 176, a left wall portion 178, through holes 179 and 180, a right lower deflected portion 181, a right lower deflection-increasing portion 181a, an inclined portion 182, a front bent portion 183, a rear bent portion 184, a steeply inclined portion 185, a concave portion 186, and through holes 187, 188, and 189 to respectively correspond to the left upper member 112, the upper wall portion 114, the left wall portion 116, the right wall portion 118, the through holes 119 and 120, the left upper deflected portion 121, the left upper deflection-increasing portion 121a, the inclined portion 122, the front bent portion 123, the rear bent portion 124, the concave portion 126, the through holes 127, 128, and 129, the left lower member 132, the bottom wall portion 134, the left wall portion 136, the right wall portion 138, the through holes 139 and 140, the left lower deflected portion 141, the left lower deflection-increasing portion 141a, the inclined portion 142, the front bent portion 143, the rear bent portion 144, the steeply inclined portion 145, the concave portion 146, and the through holes 147, 148, and 149 of the left side member 110.

The rear upper member 210 is a plate member in which a middle portion of its frond end extending in the width direction overlaps from the upper side on the rear end of the upper wall portion 14 of the lateral upper member 12 of the cross member 10, the left end of that front end overlaps from the upper side on the left rear member 62 and the left front member 64 of the left attachment member 60 in a corresponding manner, and the right end of that front end overlaps from the upper side on the right rear member 82 and the right front member 84 of the right attachment member 80 in a corresponding manner. Further, the left and right ends of the rear upper member 210 which extend in the front-rear direction overlap from the upper side on the upper wall portion 114 of the left upper member 112 of the left side member 110 and the upper wall portion 154 of the right upper member 152 of the right side member 150, respectively. The ends of the thus overlapping portions of the rear upper member 210 are welded typically by arc welding or the like in a corresponding manner, whereby the rear upper member 210 is integrated with the cross member 10, the left attachment member 60, the right attachment member 80, the left side member 110, and the right side member 150. Furthermore, the rear end of the rear upper member 210 which extends in the width direction is welded to the rear lower member 230 typically by arc welding or the like in a corresponding manner to be integrated therewith.

In detail, as for the rear upper member 210, nuts 211 and 212 standing upward are provided to be fixed at left and right ends of the front end of the rear upper member 210 which extends in the width direction, to correspond to the rear side of the left attachment member 60 and the rear side of the right attachment member 80, respectively. The nuts 211 and 212 are each used for attaching one of a plurality of fixing portions of a steering gearbox (not shown) in a corresponding manner. The rear upper member 210 is provided with through holes 213 and 214 that correspond to the nuts 211 and 212, respectively. In the rear upper member 210, through holes 215, 216, and 217 are formed on the upper side of the through holes 147, 148, and 149 of the left lower member 132 of the left side member 110 and are opposed thereto in the vertical direction, respectively. Further, a groove 218 is provided between the through holes 215 and 216 over the width direction, which is formed by recessing a portion of the rear upper member 210 downward and allows insertion of a stabilizer bar (not shown) in the width direction. Similarly, in the rear upper member 210, through holes 225, 226, and 227 are formed on the upper side of the through holes 187, 188, and 189 of the right lower member 172 of the right side member 150 and are opposed thereto in the vertical direction, respectively. The groove 218 between the through holes 215 and 216 also extends continuously in the width direction between the through hole 225 and 226.

The rear lower member 230 arranged on the lower side of the rear upper member 210 and opposed thereto in the vertical direction is a plate member in which its frond end extending in the width direction is laid from the lower side of the rear end of the bottom wall portion 24 of the lateral lower member 22 of the cross member 10 in the vertical direction, and its left and right ends both extending in the front-rear direction are laid on the right end of the bottom wall portion 134 of the left lower member 132 of the left side member 110 and the left end of the bottom wall portion 174 of the right lower member 172 of the right side member 150 in the vertical direction, respectively. The rear lower member 230 is provided with through holes 233 and 234 that are arranged on the lower side of the through holes 213 and 214 of the rear upper member 210 and are opposed thereto in the vertical direction, respectively. The ends of the thus overlapping portions of the rear lower member 230 are welded typically by arc welding or the like in a corresponding manner, whereby the rear lower member 230 is integrated with the cross member 10, the left side member 110, and the right side member 150. Further, the rear end of the rear lower member 230 which extends in the width direction is in contact with the rear end of the rear upper member 210 and is welded thereto typically by arc welding or the like, so that the rear lower member 230 is integrated with the rear upper member 210. In addition, a portion surrounded by the cross member 10, the left side member 110, the right side member 150, the rear upper member 210, and the rear lower member 230 defines a closed space.

As for the front cross member 240, its left side is in contact with the left side member 110 between the front bent portions 123 and 143 and the concave portions 126 and 146 in the front-rear direction of the left side member 110 and is integrated therewith by being welded typically by arc welding or the like, and its right side is in contact with the right side member 150 between the front bent portions 163 and 183 and the concave portions 166 and 186 in the front-rear direction of the right side member 150 and is integrated therewith by being welded typically by arc welding or the like. The front cross member 240 includes a lateral upper member 242 that extends in the width direction and a lateral lower member 252 that is arranged on the lower side of the lateral upper member 242 to be opposed thereto in the vertical direction, extends in the width direction, and is integrated with the lateral upper member 242 typically by being welded thereto by arc welding or the like while being in contact therewith. Further, the front cross member 240 defines a closed cross-section (a vertical closed cross-section) in a plane parallel to a y-z plane continuously in the width direction by the lateral upper member 242 and the lateral lower member 252 integrated with each other.

In detail, the lateral upper member 242 is a plate member typically formed from a single plate member such as a steel plate to be convex upward basically, and has an upper wall portion 244, a front vertical wall portion 246, and a rear vertical wall portion 248 that is arranged on the rear side of the front vertical wall portion 246 and is opposed to the front vertical wall portion 246 in the front-rear direction. The upper wall portion 244 connects the front vertical wall portion 246 and the rear vertical wall portion 248 to each other and has a plurality of through holes 249. As for the lateral upper member 242, in the left upper deflection-increasing portion 121a of the left side member 110, the left end of the upper wall portion 244 is in contact with the upper wall portion 114 of the left upper member 112 of the left side member 110, and the left ends of the front vertical wall portion 246 and the rear vertical wall portion 248 are in contact with the right wall portion 118 of the left upper member 112 of the left side member 110. The contact portions are integrated with each other by being welded typically by arc welding or the like to form a left joint portion J1.

The lateral lower member 252 is a plate member typically formed from a single plate member such as a steel plate to be convex downward basically, and has a bottom wall portion 254, a front vertical wall portion 256, and a rear vertical wall portion 258 that is arranged on the rear side of the front vertical wall portion 256 and is opposed to the front vertical wall portion 256 in the front-rear direction. The bottom wall portion 254 connects the front vertical wall portion 256 and the rear vertical wall portion 258 to each other and has a plurality of through holes 259 that are arranged on the lower side of the through holes 249 of the lateral upper member 242 and are opposed thereto in the vertical direction, respectively. As for the lateral lower member 252, in the left lower deflection-increasing portion 141a of the left side member 110, the left end of the bottom wall portion 254 is in contact with the bottom wall portion 134 of the left lower member 132 of the left side member 110, and the left ends of the front vertical wall portion 256 and the rear vertical wall portion 258 are in contact with the right wall portion 138 of the left lower member 132 of the left side member 110. These contact portions are integrated with each other by being welded typically by arc welding or the like to form the left joint portion J1, similar to the lateral lower member 242. From a viewpoint of increasing the area of contact of the left joint portion J1 of the front cross member 240, with the left side member 110, by cooperation of the lateral lower member 242 and the lateral lower member 252, it is preferable that the front cross member 240 has a left enlarged portion E1 in which the width in the front-rear direction (length) w of the front cross member 240 increases toward the left from the center in the width direction. In detail, the front cross member 240 is deflected toward the front side in a case where at least one pair of the front vertical wall portions 246 and 256 and the rear vertical wall portions 248 and 258 is the front vertical wall portions 246 and 256 or toward the rear side in a case where at least one pair of the front vertical wall portions 246 and 256 and the rear vertical wall portions 248 and 258 is the rear vertical wall portions 248 and 258 in a corresponding manner as approaching from the center in the width direction to left side. In association with this deflection, the upper wall portion 244 and the lower wall portion 254 form the left enlarged portion E1 which projects toward at least one of the front side and the rear side. From a viewpoint of increasing the coupling strength of the left side member 110, it is preferable that the left joint portion J1 of the front cross member 240 is set to be closer to the through hole 119 in the left upper member 112 of the left side member 110 and the through hole 139 in the left lower member 132 than to the through hole 70 in an upper wall portion of the left attachment member 60. In the front cross member 240, the lateral upper member 242 and the lateral lower member 252 may not be two separate plate members such as steel plates but may be formed from a single plate member such as a steel plate, or a tubular member, as necessary, although forming of those members becomes complicated. In addition, in the front cross member 240, the configuration to be joined to the right side member 150 is symmetrical with the configuration to be joined to the left side member 110 with respect to a plane that is parallel to a y-z plane and passes through a center line extending in the front-rear direction in the center in the width direction of a vehicle body, and therefore the detailed descriptions are omitted. That is, the configuration to be joined to the right side member 150 includes the right joint portion J2 and the right enlarged portion E2 to respectively correspond to the left joint portion J1 and the left enlarged portion E1 of the configuration to be joined to the left side member 110.

The left crush box 260 includes a fixing member 261 that is welded to its rear end typically by arc welding or the like and is fastened to the front end of the left side member 110 with a bolt (its reference sign is omitted) or the like, a left upper member 262 extending in the front-rear direction, a left lower member 272 that is arranged on the lower side of the left upper member 262 to be opposed thereto in the vertical direction, extends in the front-rear direction, and is in contact with the left upper member 262 and is integrated therewith by being welded typically by arc welding or the like, and a front end member 273 that is a flat plate member welded to the front ends of the left upper member 262 and the left lower member 272 typically by arc welding or the like. The left crush box 260 is a tubular member with its front end closed with the front end member 273. In the left crush box 260, the left upper member 262 and the left lower member 272 may not be two separate plate members such as steel plates but may be formed from a single plate member such as a steel plate, or a tubular member, as necessary, although forming of those members becomes complicated. Further, the materials and the plate thicknesses of the left upper member 262 and the left lower member 272 are typically set to be the same as each other. The materials and/or the plate thicknesses may be different between these members, as necessary.

In detail, the left upper member 262 is a plate member typically formed from a single steel plate, for example, to be convex upward basically and has an upper wall portion 264, a left wall portion 266, and a right wall portion 268 that is arranged on the right side of the left wall portion 266 to be opposed to the left wall portion 266 in the width direction. The upper wall portion 264 connects the left wall portion 266 and the right wall portion 268 to each other and has a plurality of concave portions 265 between its front end and its rear end in the front-rear direction. Each concave portion 265 is formed by recessing a general portion G shown with a virtual line to be convex downward in the upper wall portion 264. The lengths in the front-rear direction of the concave portions 265 are typically set in such a manner that a length L1 in the front-rear direction of the frontmost concave portion 265 is longer than a length Ln in the front-rear direction of another concave portion 265 on the rear side of the frontmost concave portion 265.

The left lower member 272 is a plate member typically formed from a single steel plate, for example, to be convex downward basically and has a bottom wall portion 274, a left wall portion 276, and a right wall portion 278 that is arranged on the right side of the left wall portion 276 to be opposed to the left wall portion 276 in the width direction. The bottom wall portion 274 connects the left wall portion 276 and the right wall portion 278 to each other and has a plurality of concave portions 275 between its front end and its rear end in the front-rear direction. The concave portions 275 are arranged on the lower side of the concave portions 265 of the left upper member 262 to be opposed thereto in the vertical direction, respectively, and are each formed by recessing a general portion G shown with a virtual line to be convex upward in the bottom wall portion 274. The lengths in the front-rear direction of the concave portions 275 are typically set in such a manner that the length L1 in the front-rear direction of the frontmost concave portion 275 is longer than the length Ln of another concave portion 275 on the rear side of the frontmost concave portion 275, as with the lengths of the concave portions 265 of the left upper member 262. Since the concave portions 265 and 275 serve as fragile portions and the length L1 in the front-rear direction of the frontmost concave portions 265 and 275 is set to be longer than the length Ln of other concave portions 265 and 275 on the rear side of the frontmost concave portions 265 and 275, the concave portions 265 and 275 start to be crushed in the front-rear direction from the frontmost concave portions 265 and 275 as start points. Further, by setting the height H1 of the frontmost concave portions 265 and 275 to be lower than a height Hn of other concave portions 265 and 275 (shown with the virtual line C) provided on the rear side of the frontmost concave portions 265 and 275, the concave portions 265 and 275 start to be crushed in the front-rear direction from the frontmost concave portions 265 and 275 as start points more surely.

Furthermore, the materials and the plate thicknesses of the left upper member 262 and the left lower member 272 of the left crush box 260 are typically set to be the same as or be lower in strength and thinner than those of each of the left upper member 112 and the left lower member 132 of the left side member 110. In addition, the cross-sectional areas of vertical cross sections of the concave portions 265 and 275 shown in FIG. 5A are set to be smaller than the cross-sectional areas of vertical cross sections of the front bent portions 123 and 143 shown in FIG. 5B, the cross-sectional areas of vertical cross sections of the rear bent portions 124 and 144 shown in FIG. 5C with the virtual line G, and the cross-sectional areas of vertical cross sections of the concave portions 126 and 146 shown in FIG. 5C. Therefore, when the subframe 1 is deformed by crash load applied from the front side to the rear side in frontal crash of a vehicle, crushing of the concave portions 126 and 146 starts first.

The configuration related to the right crush box 280 arranged on the right side of the left crush box 260 to be opposed thereto in the width direction is symmetrical with the configuration related to the left crush box 260 with respect to a plane that is parallel to a y-z plane and passes through a center line extending in the front-rear direction in the center in the width direction of a vehicle body, and therefore the detailed descriptions are omitted. The configuration related to the right crush box 280 includes a fixing member 281, a right upper member 282, an upper wall portion 284, a concave portion 285, a right wall portion 286, a left wall portion 288, a right lower member 292, a front end member 293, a bottom wall portion 294, a concave portion 295, a right wall portion 296, and a left wall portion 298 to respectively correspond to the fixing member 261, the left upper member 262, the upper wall portion 264, the concave portion 265, the left wall portion 266, the right wall portion 268, the left lower member 272, the front end member 273, the bottom wall portion 274, the concave portion 275, the left wall portion 276, and the right wall portion 278 of the left crush box 260.

A deformation mode of the subframe 1 having the configuration described above is described in detail in a case where crash load from the front side to the rear side in frontal crash of a vehicle is applied to the subframe 1. In the deformation mode of the subframe 1, in left constituent elements, the left crush box 260 and the left side member 110 are deformed in that order, and in the left side member 110, bending deformation occurs after crushing ends. In right constituent elements, the right crush box 280 and the right side member 150 are deformed in that order, and in the right side member 150, bending deformation starts after crushing ends. In order to achieve such a deformation mode, a configuration is set in advance which reflects mechanical characteristics defining the deformation characteristics of these constituent elements, for example, the materials, the plate thicknesses, the cross-sectional shapes, and the cross-sectional areas. The mechanical characteristics of the left constituent elements of the subframe 1 and the mechanical characteristics of the right constituent elements of the subframe 1 are set to be the same as each other, although the left constituent elements and the right constituent elements have symmetrical configurations to each other. In addition, since it is assumed that such crash load is typically applied to two portions that are the front ends of the left crush box 260 and the right crush box 280 (the front end members 273 and 293) with equal magnitudes to each other like impulsive force, the following descriptions mainly focus on the left constituent elements of the subframe 1.

First, an early deformation mode when such crash load is applied is described. When the left crush box 260 as the frontmost one of the left constituent elements of the subframe 1 is elastically deformed in the front-rear direction minutely and the deformation amount becomes D1, that is, the front end member 273 of the left crush box 260 is displaced rearward by a length D1 in the front-rear direction from its original position before application of the crash load and the displacement amount becomes D1, the subframe 1, that is, the left crush box 260 receives load F1 transferred rearward, and the concave portions 265 and 275 arranged at the frontmost positions of the left upper member 262 and the left lower member 272 of the left crush box 260 start to be crushed rearward in the front-rear direction. When the displacement amount of the front end member 273 becomes D3 (>D1), the frontmost concave portions and other concave portions 265 and 275 located on the rear side of the frontmost concave portions are completely crushed. When the left crush box 260 is crushed and shortened to, for example, about 20% or 30% of an original length thereof in the front-rear direction, the left crush box 260 is substantially completely crushed and crushing at this mode ends. Thereafter, load F3 (>F1) transferred rearward is received by the left side member 110. As described above, in the early deformation mode until the displacement amount of the front end member 273 becomes D3 from zero, the load transferred to and received by the left crush box 260 changes from zero to F3 such that after start of crushing of the concave portions 265 and 275, the crushing of the concave portions 265 and 275 is finished. Therefore, the deformation amount of the left crush box 260 is D3 in the front-rear direction. Note that when the displacement amount of the front end member 273 is D2 (D3>D2>D1), the load received by the subframe 1 increases once to F2 (F3>F2>F1) that is the maximum value of load received by the subframe 1 from start to end of crushing of the concave portions 265 and 275. Although it is considered that the left side member 110 receives a part of the load without being deformed, this load F2 can be practically considered as the maximum load received by the concave portions 265 and 275.

Next, a middle deformation mode during application of such crash load is described. The load F3 transferred to the left side member 110 causes transient elastic deformation in the left side member 110. The amount of rearward displacement in the front-rear direction of the front end member 273 of the left crush box 260 then reaches D4 (>D3), and the concave portions 126 and 146 of the left side member 110 receive load F4 (>F3) at that time and start to be crushed in the inclination direction A. At a displacement amount D5 (>D4) immediately after start of the crushing, the load received by the subframe 1 becomes F5 (>F4) that is the maximum value from start to end of crushing of the concave portions 126 and 146. Thereafter, when the displacement amount of the front end member 273 becomes D6 (>D5), the concave portions 126 and 146 are substantially completely crushed and crushing in this mode substantially ends. Load F6 (>F5) at that time is received by the front bent portions 123 and 143 and the rear bent portions 124 and 144 of the left side member 110.

Next, a later deformation mode during application of such crash load is described. The load F6 received by the front bent portions 123 and 143 and the rear bent portions 124 and 144 of the left side member 110 starts bending deformation of the front bent portions 123 and 143 in which those portions become convex upward, and also starts bending deformation of the rear bent portions 124 and 144 in which those portions become convex downward from the concave portions 126 and 146 that have been substantially completely crushed as start points of bending, so that a bent state is formed in which two sides formed by bending of each of the front bent portions 123 and 143 and the rear bent portions 124 and 144 come close to each other. In association with formation of this bent state, a bolt fastened to a vehicle body B through the through hole 70 in the upper wall portion 69 of the left attachment member 60 causes deformation of the through hole 70 and is detached from the through hole 70, so that the left-middle third vehicle-body attachment portion A3 drops out of the vehicle body B and the left attachment member 60 moves to the lower side together with the left side member 110 that is being deformed to be bent. Thereafter, the bent state progresses in such a manner that the two sides formed by bending of each of the front bent portions 123 and 143 and the rear bent portions 124 and 144 come closer to each other. Here, in the early deformation mode to the late deformation mode described above, the front cross member 240 prevents outward deformation and deflection of the left side member 110 and the right side member 150, thus preventing occurrence of an unnecessary deformation mode.

In the configuration described above, among various portions in which the subframe 1 is attached to a vehicle body, the through hole 119 provided in the left upper member 112 of the left side member 110, the through hole 139 provided in the left lower member 132 of the left side member 110, and collar members (not shown) provided to correspond to these through holes correspond to the left-front first vehicle-body attachment portion A1, the through hole 159 provided in the right upper member 152 of the right side member 150, the through hole 179 provided in the right lower member 172 of the right side member 150, and collar members (not shown) provided to correspond to these through holes correspond to the right-front second vehicle-body attachment portion A2, the through hole 70 provided in the upper wall portion 69 of the left attachment member 60 corresponds to the left-middle third vehicle-body attachment portion A3, the through hole 90 provided in the upper wall portion 89 of the right attachment member 80 corresponds to the right-middle fourth vehicle-body attachment portion A4, the through hole 120 provided in the left upper member 112 of the left side member 110, the through hole 140 provided in the left lower member 132 of the left side member 110, and collar members (not shown) provided to correspond to these through holes correspond to the left-rear fifth vehicle-body attachment portion A5, and the through hole 160 provided in the right upper member 152 of the right side member 150, the through hole 180 provided in the right lower member 172 of the right side member 150, and collar members (not shown) provided to correspond to these through holes correspond to the right-rear sixth vehicle-body attachment portion A6. Typically, each of these portions is a portion used for fastening with a fastening member such as a bolt. Further, an example is assumed in which a rigid structure without any subframe mounting member is adopted in these portions.

Among various portions in each of which the subframe 1 supports an inner pivoting portion of a suspension arm, the left opening end 35 that has the through hole 41 and the nut 42 provided in the left support member 36 and the through hole 43 provided in the left attachment member 60 corresponds to the left-front first supporting portion S1, the right opening end 45 that has the through hole 51 and the nut 52 provided in the right support member 46 and the through hole 53 provided in the right attachment member 80 corresponds to the right-front second supporting portion S2, the through hole 149 provided in the left lower member 132 of the left side member 110, the through hole 217 provided in the rear upper member 210, and collar members (not shown) provided to correspond to these through holes correspond to the left-rear third supporting portion S3, and the through hole 189 provided in the right lower member 172 of the right side member 150, the through hole 227 provided in the rear upper member 210, and collar members (not shown) provided to correspond to these through holes correspond to the right-rear fourth supporting portion S4. Typically, each of these portions is a portion used for fastening with a fastening member such as a bolt. Further, although an example is assumed in which an L-shaped lower arm is adopted as the suspension arm applied to these portions, an A-shaped lower arm or two I-shaped lower arms may be adopted. Furthermore, regarding the left-front first supporting portion S1 and the right-front second supporting portion S2, an example is assumed in which an inner cylinder of an insulator bush member (not shown) is fastened thereto. Regarding the left-rear third supporting portion S3 and the right-rear fourth supporting portion S4, although not shown, an example is assumed in which a bracket is fastened thereto and the insulator bush member is attached to the bracket.

Among various attachment portions in which various external-force application parts are attached to the subframe 1, the nut 211 and the through hole 213 provided in the rear upper member 210 and the through hole 233 provided in the rear lower member 230 correspond to the steering-gearbox left attachment portion A7, the nut 212 and the through hole 214 provided in the rear upper member 210 and the through hole 234 provided in the rear lower member 230 correspond to the steering-gearbox right attachment portion A8, the through hole 21 provided in the lateral upper member 12 of the cross member 10, the through hole 31 provided in the lateral lower member 22, the through hole 249 provided in the lateral upper member 242 of the front cross member 240, the through hole 259 provided in the lateral lower member 252, and collar members (not shown) provided to correspond to these through holes correspond to the mount attachment portion A9, the through holes 147 and 148 provided in the left lower member 132 of the left side member 110, the through holes 215 and 216 provided in the rear upper member 210, and collar members (not shown) provided to correspond to these through holes correspond to the stabilizer left attachment portion A10, and the through holes 187 and 188 provided in the right lower member 172 of the right side member 150, the through holes 225 and 226 provided in the rear upper member 210, and collar members (not shown) provided to correspond to these through holes correspond to the stabilizer right attachment portion A11. Typically, each of these portions is a portion used for fastening with a fastening member such as a bolt. Further, regarding the steering-gearbox left attachment portion A7 and the steering-gearbox right attachment portion A8, an example is assumed in which left and right mounting seats of the body of a steering gearbox are fastened thereto, respectively. Regarding the mount attachment portion A9, an example is assumed in which a bracket (not shown) for mounting a required one of a driving source, a transmission, and a reduction gear is fastened thereto. Regarding the stabilizer left attachment portion A10 and the stabilizer right attachment portion A11, although not shown, an example is assumed in which brackets are fastened thereto, respectively, and a stabilizer bar is attached to these brackets via bush members.

In the subframe 1 according to the present embodiment described above, the first side member 110 has the first extending portions 121 and 141 that each extend while being deflected outward on one side in the width direction as approaching from the rear side to the front side, and the second side member 150 has the second extending portions 161 and 181 that each extend while being deflected outward on the other side in the width direction as approaching from the rear side to the front side. The subframe 1 further includes the second cross member 240 that is opposed to the first cross member 10 on the front side thereof, couples the portions 121a and 141a of the first extending portions 121 and 141 in which the degree of outward deflection on one side in the width direction becomes large and the portions 161a and 181a of the second extending portions 161 and 181 in which the degree of outward deflection on the other side in the width direction becomes large to each other. Accordingly, when load in frontal crash biased on one of left and right sides of a vehicle is applied to one of the first side member 110 and the second side member 150, for example, in so-called offset crash, it is possible to prevent unnecessary deformation of the one side member 110 or 150 to outside in the width direction and to transfer and distribute the crash load to the other side member 150 or 110.

Further, in the subframe 1 according to the present embodiment, the joint portion J1 of the second cross member 240 to the first side member 110 has the first enlarged portion E1 in which the length in the front-rear direction increases toward one side in the width direction, and the joint portion J2 of the second cross member 240 to the second side member 150 has the second enlarged portion E2 in which the length in the front-rear direction increases toward the other side in the width direction. Accordingly, it is possible to surely prevent the side members 110 and 150 to which crash load is applied from being unnecessarily deformed outward in the width direction and to surely distribute the crash load.

Furthermore, in the subframe 1 according to the present embodiment, in the first enlarged portion E1, at least one of a wall portion on the front side and a wall portion on the rear side projects in the front-rear direction. In the second enlarged portion, at least one of the wall portions 16 and 26 on the front side and the wall portions 18 and 28 on the rear side project in the front-rear direction. Accordingly, it is possible to surely couple the side members 110 and 150 to each other to match the flexibility of the layout of the subframe 1 and its surrounding region, prevent the side members 110 and 150 to which crash load is applied from being unnecessarily deformed outward in the width direction more surely, and distribute the crash load more surely.

In addition, the subframe 1 according to the present embodiment further includes the first vehicle-body attachment member 60 on one side in the width direction, which is provided on an upper side in a vertical direction of a vehicle body with respect to the first side member 110 and the cross member 10 to project and in which the first middle vehicle-body attachment portion A3 is set between the first front vehicle-body attachment portion A1 and the first rear vehicle-body attachment portion A5 in the front-rear direction, and the second vehicle-body attachment member 80 on the other side in the width direction, which is provided on an upper side with respect to the second side member 150 and the cross member 10 to project and in which the second middle vehicle-body attachment portion A4 is set between the second front vehicle-body attachment portion A2 and the second rear vehicle-body attachment portion A6 in the front-rear direction. The joint portion J1 of the second cross member 240 to the first side member 110 is arranged to be closer to the first front vehicle-body attachment portion A1 than to the first middle vehicle-body attachment portion A3. The joint portion J2 of the second cross member 240 to the second side member 150 is arranged to be closer to the second front vehicle-body attachment portion A2 than to the second middle vehicle-body attachment portion A4. Accordingly, it is possible to couple the side members 110 and 150 to each other more surely and to prevent the side members 110 and 150 from being unnecessarily deformed outward in the width direction more surely.

In the present invention, the types, shapes, arrangements, numbers, and the like of the constituent members are not limited to those in the above embodiment, and it is needless to mention that the constituent elements can be modified as appropriate without departing from the scope of the invention, such as appropriately replacing these constituent elements with other members having equivalent operational effects.

As described above, in the present invention, it is possible to provide a vehicle subframe that can prevent occurrence of unnecessary deformation in a side member and exhibit required crash performance in frontal crash of a vehicle. Therefore, because of its general purposes and universal characteristics, applications of the present invention can be expected in a wide range in the field of a subframe of a moving body such as a vehicle.

What is claimed is:

1. A vehicle subframe attached to a vehicle body, comprising:
   a first side member that extends in a front-rear direction of the vehicle body and in which a first front vehicle-body attachment portion on a front side in the front-rear direction and a first rear vehicle-body attachment portion on a rear side in the front-rear direction are set;
   a second side member that extends in the front-rear direction of the vehicle body and is opposed to the first side member in a width direction of the vehicle body, and in which a second front vehicle-body attachment portion on the front side and a second rear vehicle-body attachment portion on the rear side are set; and
   a first cross member that extends in the width direction and couples the first side member and the second side member to each other,
   wherein the first side member has a first extending portion that extends while being deflected outward on one side in the width direction as approaching from the rear side to the front side,
   the second side member has a second extending portion that extends while being deflected outward on the other side in the width direction as approaching from the rear side to the front side, and
   the vehicle subframe further comprises a second cross member that is opposed to the first cross member on the front side thereof and couples a portion of the first extending portion in which degree of outward deflection on the one side in the width direction becomes large and a portion of the second extending portion in which degree of outward deflection on the other side in the width direction becomes large to each other,
   and wherein the vehicle subframe further comprises a first vehicle-body attachment member that is provided on the one side in the width direction on an upper side in a vertical direction of the vehicle body with respect to the first side member and the cross member to project and in which a first middle vehicle-body attachment portion between the first front vehicle-body attachment portion and the first rear vehicle-body attachment portion in the front-rear direction is set; and
   a second vehicle-body attachment member that is provided on the other side in the width direction on an upper side with respect to the second side member and the cross member to project and in which a second middle vehicle-body attachment portion between the second front vehicle-body attachment portion and the second rear vehicle-body attachment portion in the front-rear direction is set,
   wherein a joint portion of the second cross member to the first side member is arranged to be closer to the first front vehicle-body attachment portion than to the first middle vehicle-body attachment portion, and
   a joint portion of the second cross member to the second side member is arranged to be closer to the second front vehicle-body attachment portion than to the second middle vehicle-body attachment portion.

2. The vehicle subframe according to claim 1, wherein
in a first deflection-increasing portion that is the portion of the first extending portion in which the degree of the outward deflection on the one side in the width direction becomes large, the first extending portion has a first outer wall portion, in which the degree of the outward deflection on the one side in the width direction becomes large, and a first inner wall portion, in which the degree of the outward deflection on the one side in the width direction does not increase as compared with the first outer wall portion, and
in a second deflection-increasing portion that is the portion of the second extending portion in which the degree of the outward deflection on the other side in the width direction becomes large, the second extending portion has a second outer wall portion, in which the degree of the outward deflection on the other side in the width direction becomes large, and a second inner wall portion, in which the degree of the outward deflection on the other side in the width direction does not increase as compared with the second outer wall portion.

3. The vehicle subframe according to claim 1,
wherein a joint portion of the second cross member to the first side member has a first enlarged portion in which a length in the front-rear direction becomes longer toward the one side in the width direction, and
a joint portion of the second cross member to the second side member has a second enlarged portion in which a length in the front-rear direction becomes longer toward the other side in the width direction.

4. The vehicle subframe according to claim 3,
wherein in the first enlarged portion, at least one of a wall portion on the front side and a wall portion on the rear side projects in the front-rear direction, and
in the second enlarged portion, at least one of a wall portion on the front side and a wall portion on the rear side projects in the front-rear direction.

* * * * *